United States Patent
Kim et al.

(10) Patent No.: US 12,260,743 B2
(45) Date of Patent: Mar. 25, 2025

(54) INFORMATION OUTPUT DEVICE

(71) Applicant: DOT INCORPORATION, Seoul (KR)

(72) Inventors: Ju Yoon Kim, Gimpo-si (KR); Ji Ho Kim, Gimpo-si (KR); Hyeon Cheol Park, Gwangmyeong-si (KR)

(73) Assignee: Dot Incorporation, Seoul (KR)

( * ) Notice: Subject to any disclaimer, the term of this patent is extended or adjusted under 35 U.S.C. 154(b) by 377 days.

(21) Appl. No.: 17/657,828

(22) Filed: Apr. 4, 2022

(65) Prior Publication Data
US 2022/0230517 A1    Jul. 21, 2022

Related U.S. Application Data

(63) Continuation-in-part of application No. 17/115,438, filed on Dec. 8, 2020, now Pat. No. 11,322,003, which is a continuation-in-part of application No. PCT/KR2019/006857, filed on Jun. 7, 2019.

(30) Foreign Application Priority Data

Jun. 8, 2018 (KR) .................. 10-2018-0066339
Dec. 23, 2021 (KR) .................. 10-2021-0186176

(51) Int. Cl.
*H04B 3/36*        (2006.01)
*G08B 6/00*        (2006.01)

(52) U.S. Cl.
CPC .................................. *G08B 6/00* (2013.01)

(58) Field of Classification Search
CPC .. G08B 6/00; G06F 3/01; G06F 3/016; H02N 11/00; H02N 11/006
See application file for complete search history.

(56) References Cited

U.S. PATENT DOCUMENTS

| 5,449,292 A | 9/1995 | Tani et al. |
| 6,217,338 B1 | 4/2001 | Tieman |
| 7,737,828 B2 | 6/2010 | Yang et al. |

(Continued)

FOREIGN PATENT DOCUMENTS

| JP | 2005-266358 A | 9/2005 |
| KR | 10-2006-0027006 A | 3/2006 |

(Continued)

OTHER PUBLICATIONS

International Search Report and Written Opinion mailed Sep. 6, 2019 in International Application No. PCT/KR2019/006857, in 18 pages.

(Continued)

*Primary Examiner* — Toan N Pham
(74) *Attorney, Agent, or Firm* — Knobbe, Martens, Olson, & Bear, LLP

(57) ABSTRACT

This application relates to an information output device using a unit block module. Due to the use of the unit block module, apparatus of various sizes may be simply constructed and/or designed, durability and user convenience may be improved, waterproof properties are provided, power consumption is minimized, and an operation error of a driving module may be minimized. And, when a pin is driven down, the pin may be driven down more easily by the attraction of a magnetic material and a magnetic member.

10 Claims, 43 Drawing Sheets

(56) References Cited

U.S. PATENT DOCUMENTS

| | | | | |
|---|---|---|---|---|
| 8,690,576 B2* | 4/2014 | Murphy | ............... | G09B 21/004 |
| | | | | 434/114 |
| 8,740,618 B2 | 6/2014 | Shaw | | |
| 9,734,731 B2 | 8/2017 | Van Hees et al. | | |
| 9,812,033 B2* | 11/2017 | Chari | ................... | G09B 21/004 |
| 11,011,076 B2* | 5/2021 | Seo | ......................... | G06F 3/016 |

FOREIGN PATENT DOCUMENTS

| | | | |
|---|---|---|---|
| KR | 10-2017-0052384 A | 5/2017 | |
| KR | 10-2017-0066029 A | 6/2017 | |
| KR | 10-2017-0071458 A | 6/2017 | |
| KR | 10-2017-0089827 A | 8/2017 | |
| KR | 20-0484372 Y1 | 8/2017 | |
| KR | 10-2017-0135774 A | 12/2017 | |
| KR | 10-2019-0133929 A | 12/2019 | |
| KR | 10-2019-0139634 A | 12/2019 | |

OTHER PUBLICATIONS

Office Action dated Jul. 21, 2021 in U.S. Appl. No. 17/115,438.
Notice of Allowance dated Jan. 3, 2022 in U.S. Appl. No. 17/115,438.
Office Action received in Korean Application No. 10-2021-0186176 dated Sep. 19, 2023.
Notice of Allowance received in Korean Application No. 10-2021-0186176 dated Apr. 22, 2024.

* cited by examiner

INFORMATION OUTPUT DEVICE

CROSS REFERENCE TO RELATED APPLICATIONS

This application is a continuation-in part of U.S. patent application Ser. No. 17/115,438, filed on Dec. 8, 2020, which is a continuation-in part of International Patent Application No. PCT/KR2019/006857, filed on Jun. 7, 2019, which claims priority to Korean patent application No. 10-2018-0066339 filed on Jun. 8, 2018, contents of each of which are incorporated herein by reference in their entireties. This continuation-in-part application also claims priority to Korean patent application No. 10-2021-0186176 filed on Dec. 23, 2021, the contents which are incorporated herein by reference in its entirety.

BACKGROUND

Technical Field

One or more embodiments of the disclosure relate to an information output device.

Description of Related Technology

Users may recognize information in a variety of ways. To this end, various types of information output apparatus are used.

For example, a visual information output apparatus using a printed material, and an acoustic information output apparatus using sound are used.

In particular, in modern times, information output apparatus including electronic technology is also frequently used in accordance with an increase of information amount and technological development, and a display device having a plurality of pixels is commonly used as a visual information output apparatus.

SUMMARY

Embodiments of the present disclosure provide a tactile implementation information output apparatus that is easy to assemble and design, and is simple to maintain.

In addition, embodiments of the present disclosure provide an information output apparatus that may improve durability and user convenience, and minimize power use.

An information output apparatus in accordance with An embodiment of the present disclosure may comprise at least one unit block module each including a plurality of expression holes, at least one first fastening part and at least one second fastening part provided in a form that may be coupled to the at least one first fastening part, a plurality of pins located in each of the at least one unit block module and moved to be exposed through the plurality of expression hole, a plurality of activation modules located in each of the at least one unit block module, moving the plurality of pins, and each including a coil, a control panel coupled to the at least one unit block module and including a plurality of terminals electrically connected to the coils of the plurality of activation modules and a control module electrically connected to the plurality of terminals and provided to control an operation of the plurality of activation modules.

The at least one unit block module includes a first unit block module and a second unit block module adjacent to each other, and a first fastening part of the first unit block module and a second fastening part of the second unit block module are coupled, and the first unit block module and the second unit block module may be coupled to the control panel.

Each of the at least one unit block module includes a housing having a first surface, a second surface and a third surface facing in different directions, and wherein the plurality of expression holes are located on the first surface, the first fastening part is located on the second surface, and the second fastening part may be located on the third surface.

Each of the plurality of activation modules may include a driving unit including the coil and a moving unit placed between the driving unit and the plurality of pins, including a magnetic member having a first polarity and a second polarity, and providing motion to the plurality of pins.

The information output device may further include a partition wall positioned between the driving unit and the moving unit.

The moving unit may be rotatably provided.

The magnetic member may be disposed at a position spaced apart from a center of the moving unit.

A rotation center of the moving unit may be arranged to be spaced apart from a center of rotation of the moving unit.

A rotation center of the moving unit may be provided to be movable.

The driving unit may further include a support projecting toward the moving unit.

Other aspects, features, and advantages than those described above will become apparent from the following drawings, claims, and detailed description of the disclosure.

An information output apparatus according to the embodiments of the present disclosure may easily configure and/or design various sized apparatus by using a unit block module.

The information output apparatus according to the embodiments of the present disclosure may be easily maintained when a specific unit block module fails.

The information output apparatus according to the embodiments of the present disclosure may improve durability and user convenience.

The information output apparatus according to the embodiments of the present disclosure may provide a waterproof function when a pin is exposed to a moisture environment.

The information output apparatus according to the embodiments of the present disclosure may reduce power consumption and enable low power operation.

The information output apparatus according to the embodiments of the present disclosure may minimize an operation error of a driving module.

The information output apparatus according to the embodiments of the present disclosure may maintain a position of the pin even when the voltage is not applied, so that an optimal tactile expression may be realized in a state in which power use is minimized.

Also provided is an information output apparatus including: an upper unit accommodating an expression unit therein, the expression unit being formed to move in at least one direction and to be sensed by a user; a lower unit arranged to overlap the upper unit and formed to accommodate a driving force providing unit for providing a driving force for the expression units; and a base unit arranged to overlap the lower unit and face a surface opposite to a surface, facing the upper unit, of the lower unit.

According to the embodiment, the upper unit may be formed to accommodate a plurality of expression units.

According to the embodiment, the lower unit may be formed to accommodate a plurality of driving force providing units corresponding to the plurality of expression units.

According to the embodiment, the driving force providing unit may include a coil unit arranged around a driving support unit.

According to the embodiment, the upper unit may be formed to be coupled to or separated from the lower unit.

According to the embodiment, coupling or separation between the upper unit and the lower unit may be performed by a pressure or a tensile force applied from an external source.

According to the embodiment, the lower unit may be formed to be coupled to or separated from the base unit.

According to the embodiment, the upper unit may include a moving unit or a moving part to be moved by a driving force provided by the driving force providing unit, to transfer the driving force to the expression unit.

According to the embodiment, the moving unit or the moving part may be formed to perform an angular movement or a rotational movement in at least one direction.

According to the embodiment, a plurality of information output apparatuses may be arranged
- to be adjacent to each other in a direction adjacent to at least one of a plurality of side surfaces of the upper unit, the lower unit, and the base unit.

Other aspects, features and advantages of the present disclosure will become better understood through the accompanying drawings, the claims and the detailed description.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Figure 1:
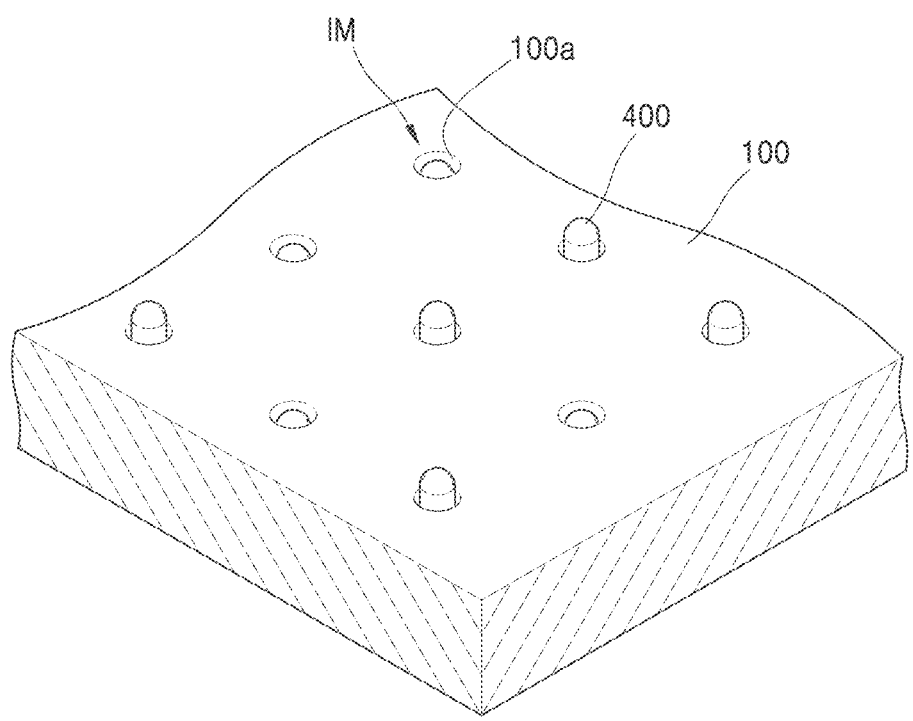
FIG. 1 is a perspective view schematically showing an information output apparatus according to an embodiment.

However, in the case of such a display device, various circuits are built in, so that manufacturing is not easy and control is inconvenient.

On the other hand, various forms of information output are required due to technological development and diversification of lifestyle.

For example, various information output apparatuses may be required according to a situation of each user, and in particular, when a user has a certain weakened sense, for example, when the user is visually impaired, it is necessary to output information through tactile sense.

To output information through the tactile sense, a pin needs to be driven. When a specific driving unit malfunctions, the entire device needs to be disassembled or replaced to repair the same. In addition, as the area of the device increases, there is a limitation that design and assembly become more difficult. In addition, in the case of the output of information through tactile sense, it is difficult to easily control and stably derive the same. Thus, there is a limitation in improving user's convenience through an improvement in information output apparatuses.

The embodiments may have various transformations, and specific embodiments are illustrated in the drawings and are described in detail in the detailed description. Effects and features of the embodiments, and methods of achieving them will be clarified through the following description in detail with reference to the drawings. However, the present disclosure is not limited to the embodiments disclosed below, but may be implemented in various forms.

The embodiments will be described below in more detail with reference to the accompanying drawings. Those components that are the same or are in correspondence are rendered the same reference numeral regardless of the figure number, and redundant explanations are omitted.

While such terms as "first," "second," etc., used in embodiments may be used to describe various components, such components must not be limited to the above terms. The above terms are used only to distinguish one component from another.

In all embodiments of the specification herein, a unit may denote a single component that executes a certain program, but embodiments of the present disclosure are not limited thereto, and may be a partitioned area of at least one storage medium storing the program.

In the following embodiments, an expression used in the singular encompasses the expression of the plural, unless it has a clearly different meaning in the context. In the present specification, it is to be understood that the terms such as "including," "having," and "comprising" are intended to indicate the existence of the features or components disclosed in the specification, and are not intended to preclude the possibility that one or more other features or components may exist or may be added.

In the drawings, the size of components may be exaggerated or reduced for convenience of description. For example, since the size and thickness of each component shown in the drawings are arbitrarily shown for convenience of description, the following embodiments are not necessarily limited to those illustrated.

FIG. 1 is a perspective view schematically showing an information output apparatus according to an embodiment.

Referring to FIG. 1, an information output apparatus according to an embodiment may include an expression surface 100 having a plurality of first expression holes 100a. The expression surface 100 may include a flat surface as shown in FIG. 1.

At least one information output module IM is located inside the expression surface 100, and a pin 400 of each information output module IM may express a protruding signal on the expression surface 100 by entering and exiting the expression surface 100 through the first expression hole 100a. Such the protruding signal may constitute a variety of signal systems by the plurality of pins 400 selectively repeating entry and exit at the first expression hole 100a.

In the information output apparatus, the expression surface 100 may be formed to face a user. Therefore, the protruding signal by the selective entry and exit of the plurality of pins 400 exposed on the expression surface 100 may be recognized as a direct and local tactile sensation to the user, and the user may receive direct vibration in a position where the user receives tactile sensation from the plurality of pins 400. The protruding signal formed by such a direct and local tactile sensation may transmit an accurate signal to the user because residual vibration does not occur around the target, unlike a general vibration signal of portable electronic devices. Accordingly, a signal acquired through tactile sense such as braille may be implemented by the protruding signal as described above, and various other signals such as a military signal, a picture signal, a code signal, and a direction signal may be accurately implemented.

Figure 2:
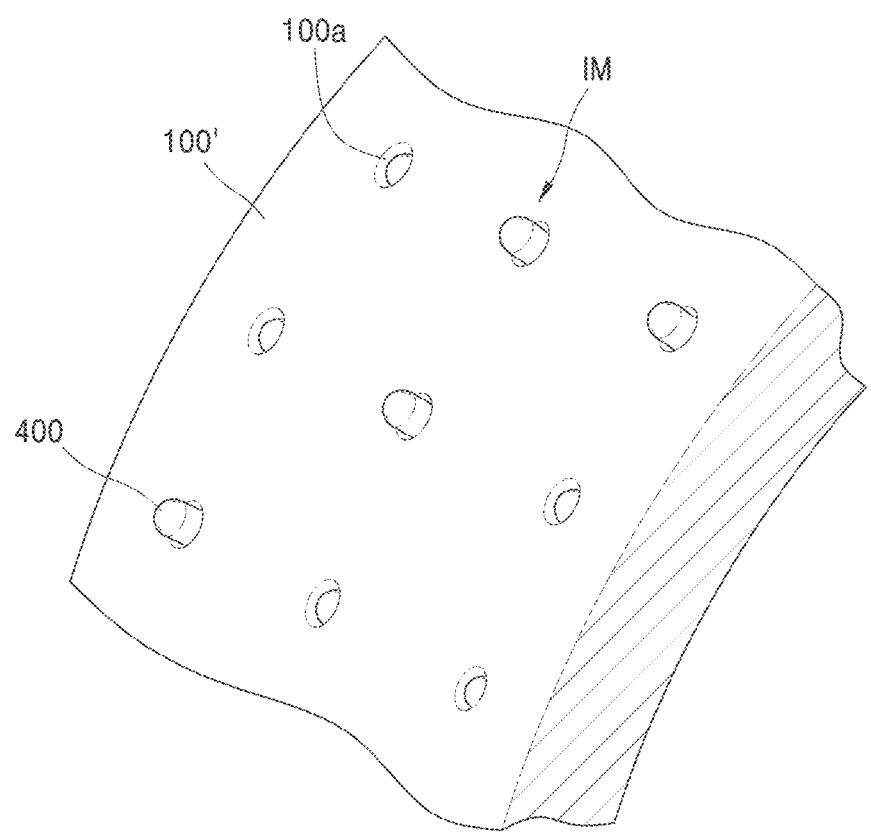
FIG. 2 is a perspective view schematically showing an information output apparatus according to another embodiment.

FIG. 2 is a perspective view schematically showing an information output apparatus according to another embodiment.

The information output apparatus according to the embodiment illustrated in FIG. 2 has an expression surface 100' including a curved surface. The expression surface 100' including such the curved surface also has a plurality of first expression holes 100a, and at least one information output module IM may be located inside a first expression hole 100a. Although the curved surface is shown in FIG. 2 as a surface having a single curvature, embodiments are not limited thereto, and the curved surface may include an irregular curved surface having a plurality of curvatures. In this case, an open direction of at least some of the plurality of first expression holes 100a may be different from each other, and accordingly, an entry direction of at least a portion of the plurality of pins 400 may also be different from each other.

Figure 3:
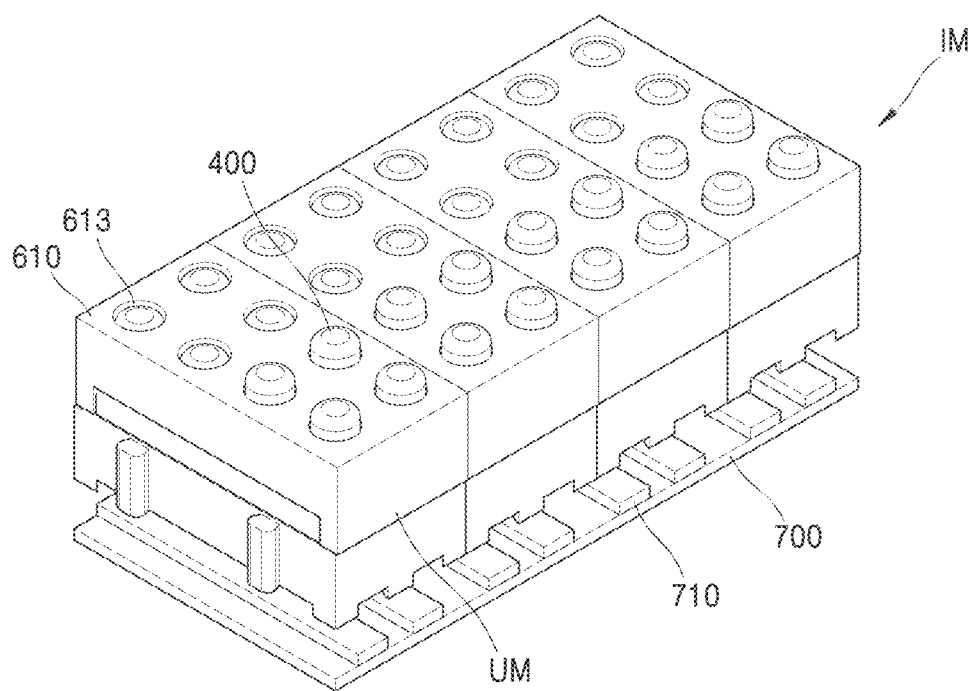
FIG. 3 is a configuration diagram schematically showing an information output module according to an embodiment.

As such, the information output apparatus according to the embodiments includes the at least one information output module IM, and FIG. 3 is a configuration diagram schematically showing the information output module IM according to an embodiment.

Referring to FIG. 3, an embodiment of the information output module IM may include at least one unit block module UM. According to the embodiment illustrated in FIG. 3, it is shown that the information output module IM include four unit block modules UM that are coupled together in a line. The present disclosure is not necessarily limited to this, and a plurality of unit block modules UM may be coupled in various directions.

The unit block module UM may include a plurality of second expression holes 613, and the second expression holes 613 may be aligned with the first expression holes on the expression surface. The plurality of pins 400 may selectively entry and exit through the second expression holes 613.

The information output module IM further includes a control plate 700.

The control plate 700 may include a circuit pattern, and may include a plurality of terminals 710 to be exposed at least to the outside. Each of the plurality of terminals 710 is electrically connected to an activation module located in the unit block module UM, and accordingly, an electrical signal may be applied to the activation module.

The plurality of unit block modules UM may be coupled to one control plate 700. However, the present disclosure is not limited to the embodiment in which one information output module IM includes one control plate 700. In an embodiment, one information output module IM may include a plurality of control plates 700.

Figure 4:
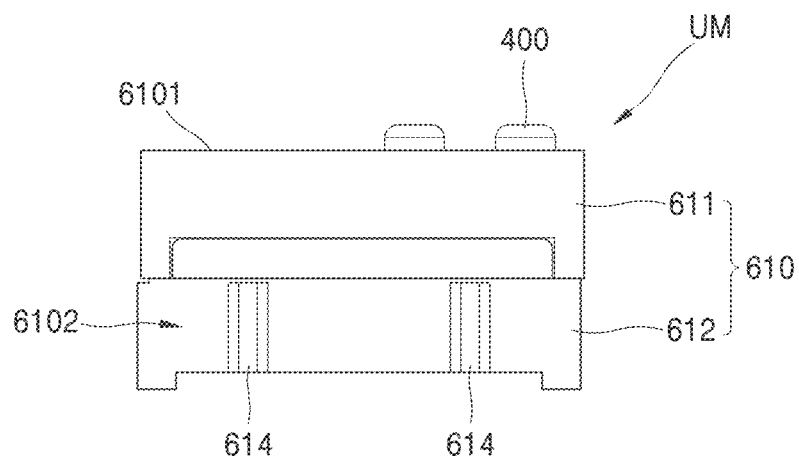
FIG. 4 is a view showing an aspect of a unit block module according to an embodiment.
Figure 5:
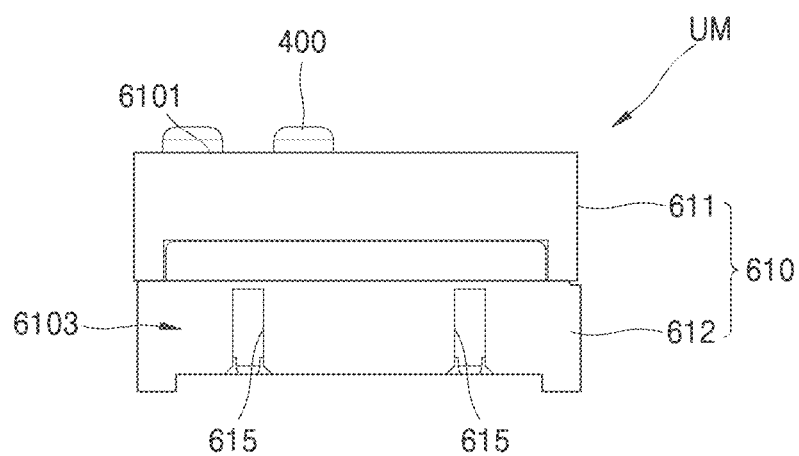
FIG. 5 is a view showing another aspect of a unit block module according to an embodiment.

The unit block module UM may include a housing 610 as shown in FIGS. 4 and 5.

According to an embodiment, the housing 610 may include a first housing 611 and a second housing 612 which are coupled to each other. The first housing 611 faces the expression surface, and the second housing 612 may be coupled to the control plate 700. Therefore, although not shown in the drawings, the first housing 611 may further include a coupling element that may be coupled to the inside of the expression surface, and the second housing 612 may further include a coupling element that may be coupled to the control plate 700.

The unit block module UM may be provided with a first fastening part 614 and a second fastening part 615 in the housing 610. The first fastening part 614 and the second fastening part 615 are provided to be fastened to each other, and are formed for the coupling to adjacent unit block modules. According to an embodiment, the first fastening part 614 may be at least one protrusion protruding outward. In addition, the second fastening part 615 may be at least one groove that is introduced inward to face the at least one protrusion. Therefore, the first fastening part and the second fastening part of adjacent unit block modules may be fastened to each other. The structures of the first fastening part 614 and the second fastening part 615 are not necessarily limited thereto, and various other types of fastening structures coupled to and fastened to each other may be applied.

According to an embodiment, the housing 610 may include a first surface 6101, a second surface 6102, and a third surface 6103 facing different directions. In this case, the first surface 6101 may be a surface facing an inner surface of the expression surface 100 of FIGS. 1 and 2, and the second surface 6102 and the third surface 6103 may each be a surface that extends perpendicular to the first surface 6101. According to FIGS. 4 and 5, the second surface 6102 and the third surface 6103 may be opposed to each other, but embodiments of the present disclosure are not limited thereto. In an embodiment, the second surface 6102 and the third surface 6103 may be disposed perpendicular to each other.

In the structure of the housing 610, the second expression hole 613 may be formed on the first surface 6101. Therefore, the pin 400 is selectively projected out of the housing 610 through the first surface 6101.

The second surface 6102 and the third surface 6103 may each be a surface facing an adjacent unit block module (UM). The first fastening part 614 may be located on the second surface 6102 and the second fastening part 615 may be located on the third surface 6103. Therefore, a first unit block module and a second unit block module adjacent to the first unit block module may be fastened in such a way that a first fastening part of the first unit block module and a second fastening part of the second unit block module are fastened to each other. At this time, the first surfaces of the adjacent unit block modules are connected to each other to form a flat surface.

In the present disclosure, the plurality of unit block modules UM are fastened in one direction, thereby constituting one information output module IM. When a braille display device is implemented, the unit block module UM may be a unit constituting one braille character, and to this end, may include pins 400 of 2×3 or 2×4. In addition, as a plurality of such unit block modules UM are connected, a pad implementing braille information with a plurality of pins 400 may be formed. According to the present disclosure, as described above, unit block modules UM are coupled to constitute the information output module IM. Thus, apparatuses of various sizes can be simply configured and/or designed and, when a specific unit block module UM malfunctions, the maintenance may be easily performed.

In the embodiment illustrated in FIG. 3, one information output module IM is configured by coupling a plurality of unit block modules UMs, but embodiments are not limited thereto. In an embodiment, one unit block module UM may constitute one information output module IM. In this case, the first fastening part 614 and the second fastening part 615 of the unit block module UM are coupled to a casing of the apparatus and may fix the unit block module UM.

Optionally, in the information output module IM according to an embodiment, the first surface 6101 of the housing 610 constituting the unit block module UM may be the expression surface as described above. Therefore, in this case, the information output apparatus may be configured with the first surface 6101 exposed to the outside.

Figure 6:
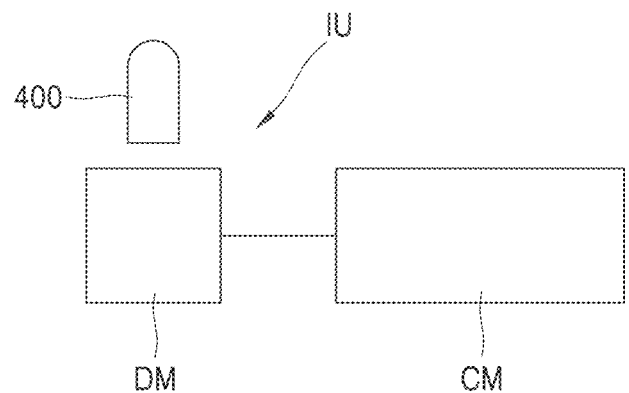
FIG. 6 is a configuration diagram schematically showing an information output unit according to an embodiment.

Each unit block module UM may include an information output unit IU as illustrated in FIG. 6 therein.

Each information output unit IU may include an activation module DM positioned opposite to the pin 400. The activation module DM may be electrically connected to the terminal 710 of the control plate 700, and the terminal 710 may be electrically connected to a control module CM. Therefore, the activation module DM may be electrically connected to the control module CM. The control module CM may control the operation of each activation module DM by transmitting a signal for protruding and entering the pin 400 to the activation module DM.

The activation module DM generates a driving force according to the signal of the control module CM and transmits the driving force to the pin 400, and various driving modules for protruding and entering the pin 400 may be applied.

Figure 7:
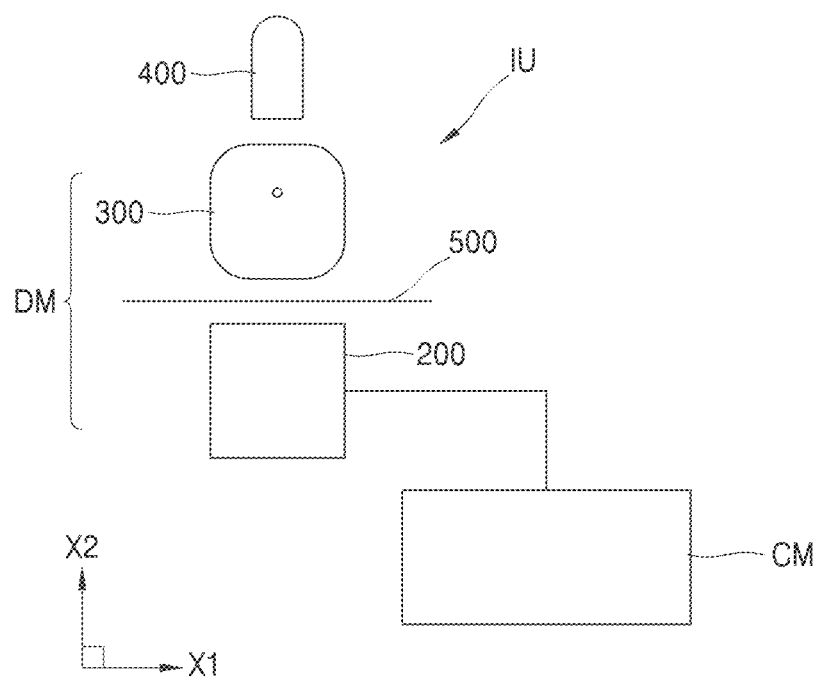
FIG. 7 is a configuration diagram schematically showing an information output unit according to another embodiment.

FIG. 7 schematically shows an embodiment of the activation module DM.

Referring to FIG. 7, the embodiment of the activation module DM may include a driving unit 200 and a moving unit 300.

The driving unit 200 may include a coil (not shown) electrically connected to the control module CM. The coil may be wound along a first direction X1, whereby a magnetic field may be formed in a second direction X2 as an electrical signal is applied from the control module CM. The driving unit 200 may be provided to maintain a fixed state thereof. The expression "electrically connected" does not necessarily mean a wired connection, but also means that an electrical signal may be transmitted by wireless communication, and includes a case in which another transmission medium exists between them. This may be applied equally to the embodiments of the present specification.

The moving unit 300 may be provided to move in response to an operation of the driving unit 200, more specifically, a magnetic field formed by a coil included in the driving unit 200. To this end, the moving unit 300 may include a magnet (not shown). The magnet has a first polarity and a second polarity opposite to the first polarity and thus, in response to the magnetic field formed by a coil, the magnet may move the moving unit 300 in the second direction X2. The movement of the moving unit 300 is transmitted to the pin 400, and thus, the protruding and entering movement of the pin 400 may be performed.

According to an embodiment, the moving unit 300 may be provided to perform a rotational movement, which may include movement in the second direction X2 as a result. The moving unit 300 may move depending on the movement of the driving unit 200, and thus may not be electrically connected to the control module CM.

The pin 400 is driven by the moving unit 300, and may move along the second direction.

According to an embodiment, the pin 400 may be in contact with the moving unit 300. In this case, since the moving unit 300 includes movement in the second direction X2, the pin 400 may selectively enter and exit through the expression hole along the second direction X2. The pin 400 may be coupled to the moving unit 300, but embodiments of the present disclosure are not limited thereto, and may include a transmission medium (not shown) for transferring physical motion between the moving unit 300 and the pin 400.

According to embodiments of the present disclosure, it is not necessarily limited thereto, and at least some of the pins 400 may be separated from the moving unit 300. In this case, the pin 400 may move in the second direction by being directly connected to the moving unit 300, or by being indirectly linked to the moving unit 300 via a separate link mechanism (not shown) or a motion transmission mechanism (not shown). The direction of movement of the pin 400 may include a second direction X2, and may be various directions including the first direction X1. In this case, the movement direction of the pin 400 may be an entry/exit direction for implementing the above-described protruding signal. The following description is based on the embodiment in which the pin 400 is coupled to the moving unit 300, but embodiments are not limited to this configuration. The following description may be applied to the embodiment in which the pin 400 is separated from the moving unit 300.

The second direction X2 may be a direction that is different from the first direction X1. According to the embodiment illustrated in FIG. 7, the second direction X2 may be perpendicular to the first direction X1.

Optionally, in order to prevent the pin 400 and/or the moving unit 300 from protruding outside the expression surface 100, when the location of the information output apparatus is changed, for example, when the information output apparatus is turned over, while the power is not applied to the driving unit 200, a separate device (not shown) may be placed between the pin 400 and the inside of the expression surface 100 and/or between the moving unit 300 and the inside of the expression surface 100. The device may be an elastic member, and when the magnetic force of the driving unit 200 exceeds the elastic force of the elastic member, the pin 400 may protrude outside the expression surface 100. This embodiment may be applied to any embodiment of the present specification.

Meanwhile, as shown in FIG. 7, a partition wall 500 may be placed between the driving unit 200 and the moving unit 300, and the driving unit 200 and the moving unit 300 may be provided to be physically separated from each other by the partition wall 500. As the driving unit 200 and the moving unit 300 are physically separated, the driving unit 200 may be sealed from moisture, and even when the moving unit 300 is in an environment exposed to moisture, this environment may not affect the driving unit 200.

Figure 8:
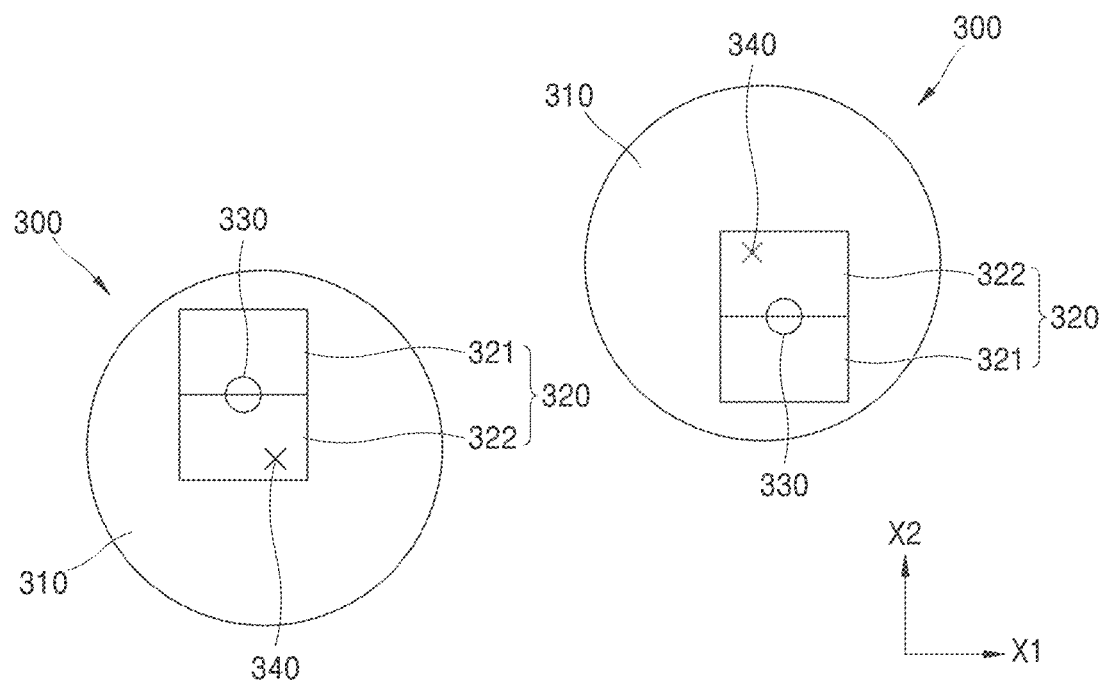
FIG. 8 is a view schematically showing an embodiment of a moving unit.

FIG. 8 is a cross-sectional view schematically showing an embodiment of the moving unit 300.

The moving unit 300 may include a body 310 rotatably provided, and the body 310 may be provided as a circular plate as shown in FIG. 8. However, the present disclosure is not necessarily limited thereto, and the body 310 may be formed in various shapes capable of transmitting power to a pin as the body 310 rotates around the rotation axis 330.

The body 310 of the moving unit 300 rotates around the rotation axis 330, and the rotation axis 330 may be spaced apart from the center of the moving unit 300, more specifically, the center 340 of the body 310. Accordingly, when the body 310 rotates around the rotation axis 330, an effect of moving in the second direction X2 as shown in the right image of FIG. 8 may be obtained. As the body 310 rotates and moves in the second direction X2, this movement is transmitted to the pin 400, and the pin 400 may also move in the second direction X2.

The moving unit 300 may include a magnetic member 320. Optionally, the magnetic member 320 may also be arranged to be spaced apart from the center of the moving unit 300, specifically, the center 340 of the body 310. Accordingly, when the body 310 of the moving unit 300 rotates under the influence of the magnetic field by the coil of the driving unit 200, it may be efficiently rotated with less force.

The magnetic member 320 may be embedded in the body 310, and a permanent magnet may be used. However, embodiments of the present disclosure are not limited thereto, and a magnetic body in which a N pole 321 and a S pole 322 are formed along the second direction X2 may be used.

Figure 9:
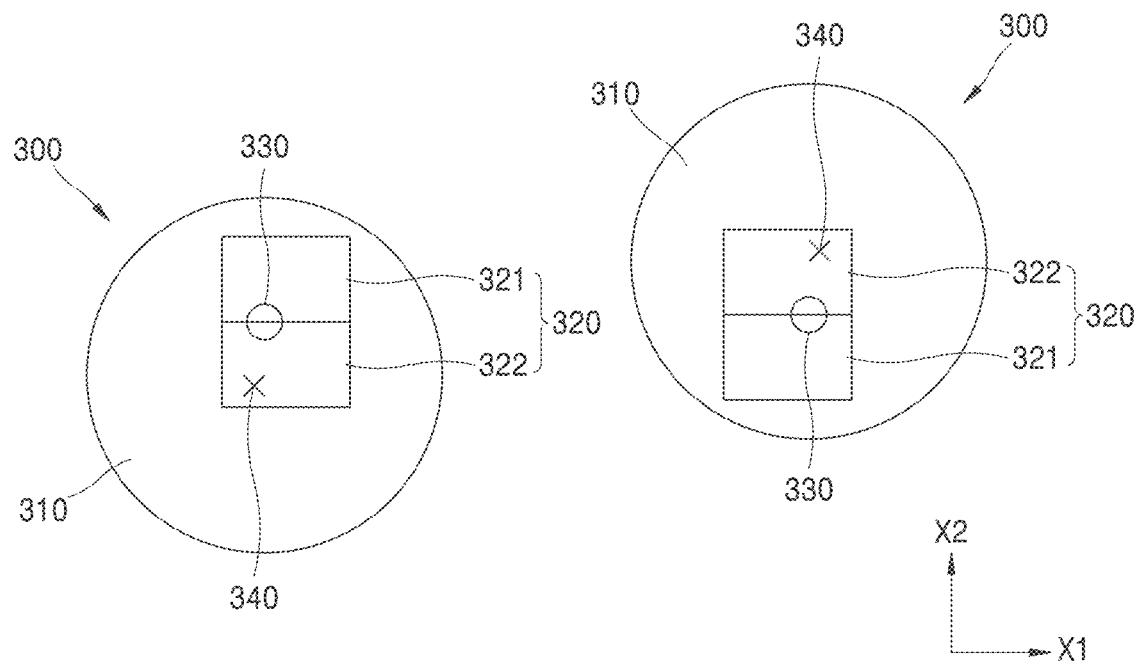
FIG. 9 is a view schematically showing another embodiment of a moving unit.

As shown in FIG. 8, a center of the magnetic member 320 may be disposed at the same position as the rotation axis 330 of the body 310. However, embodiments are not limited thereto, and as in the embodiment illustrated in FIG. 9, the center of the magnetic member 320 may be spaced apart from the rotation axis 330 of the body 310. As such, a rotation efficiency of the body 310 may be maximized by adjusting a positional relationship of the rotation axis 330 of the body 310 and the center of the magnetic member 320.

Meanwhile, the rotation axis 330 of the body 310 may be formed in various shapes.

Figure 10:
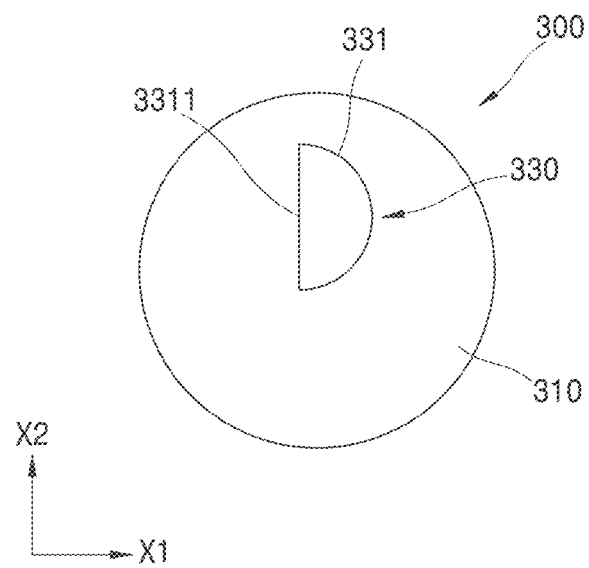
FIG. 10 is a view schematically showing another embodiment of a moving unit.

That is, as shown in FIG. 10, the rotation axis 330 may include a first rotation axis 331. The first rotation axis 331 may be formed in a semicircle shape, and may include, for example, a straight portion 3311 extending along the second direction X2. The straight portion 3311 may be positioned close to a center of rotation.

Figure 11:
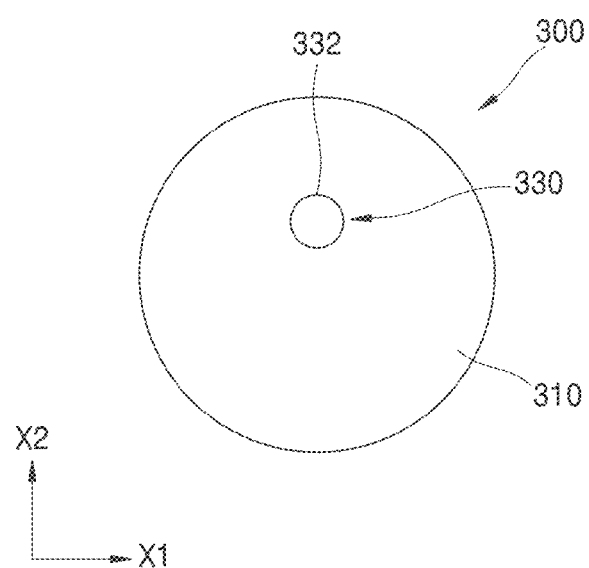
FIG. 11 is a view schematically showing another embodiment of a moving unit.

According to another embodiment illustrated in FIG. 11, the rotation axis 330 may include a second rotation axis 332. The second rotation axis 332 may be circular.

Figure 12:
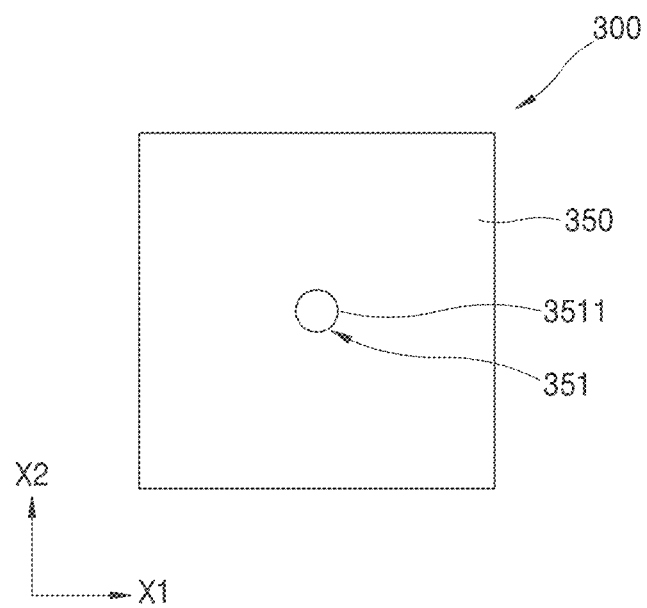
FIG. 12 is a view schematically showing an embodiment of a holder of a moving unit.

The body 310 may be mounted on a holder 350 shown in FIG. 12, the holder 350 may be formed as a box body, and the holder 350 may accommodate the body 310 therein, and may include a support groove 351 supporting the rotation axis 330 of the body 310. The holder 350 may have sufficient space therein so that the body 310 may rotate while the rotation axis 330 is supported on the support groove 351.

Figure 13:
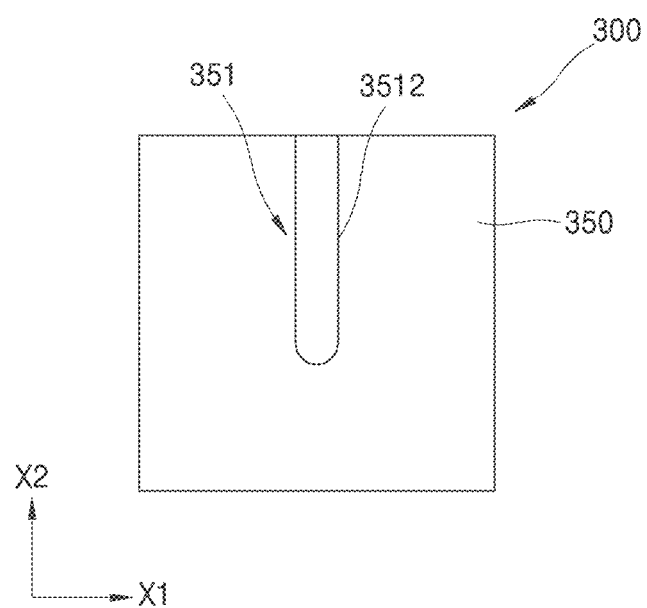
FIG. 13 is a view schematically showing another embodiment of a holder of a moving unit.

The support groove 351 may be formed in various shapes, and according to the embodiment illustrated in FIG. 13, the support groove 351 may include a first support groove 3511 provided in a circular shape. Accordingly, while the position of the rotation axis 330 mounted on the support groove 351 remains unchanged, the body may rotate.

According to another embodiment illustrated in FIG. 13, the support groove 351 may include a second support groove 3512. The second support groove 3512 may be formed in a straight line. The second support groove 3512 may extend along the second direction X2. Accordingly, the position of the rotation axis 330 mounted on the second support groove 3512 may move along the second direction X2. As the position of the rotation axis 330 moves along the second direction X2, the body 310 may move along the second direction X2 while rotating, whereby the body 310 may move the pin 400 with only a small force. In addition, as the body 310 moves toward the pin 400 while rotating along the second direction X2, the pin 400 may be maintained in a fixed state even when the coil is blocked with electricity.

Figure 14:
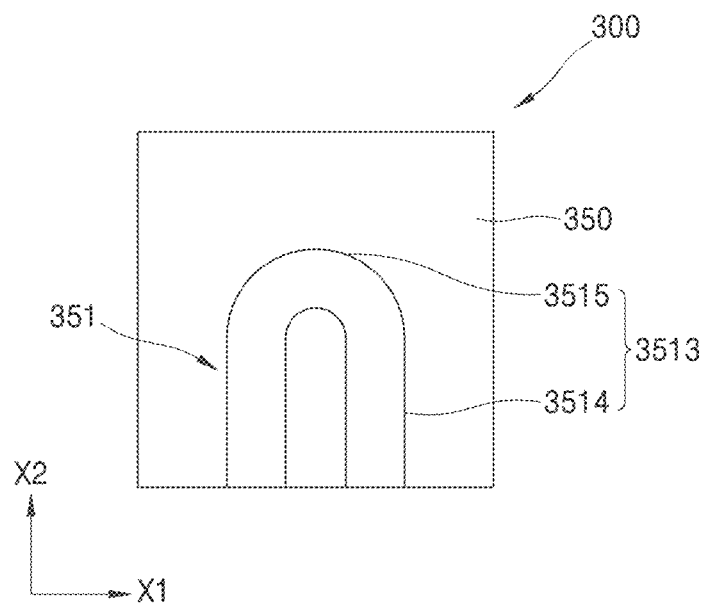
FIG. 14 is a view schematically showing another embodiment of a holder of a moving unit.

The straight shape may be provided in various shapes, and according to an embodiment illustrated in FIG. 14, the support groove 351 may include a third support groove 3513 provided in an inverted U shape. The third support groove 3513 may include a straight section 3514 and a curved section 3515. Accordingly, while the body 310 rotates, the rotation axis 330 of the body 310 may be moved from the straight section 3514 to the other straight section through the curved section 3515. Accordingly, in the state where the pin 400 is raised outside of the expression surface and the state where it is lowered inside of the expression surface, the distance between the magnetic member and the coil may be maintained constant, whereby the pin 400 may move with low power.

Various embodiments of the moving unit 300 as described above may be applied in combination to all embodiments of the present specification.

Figure 15:
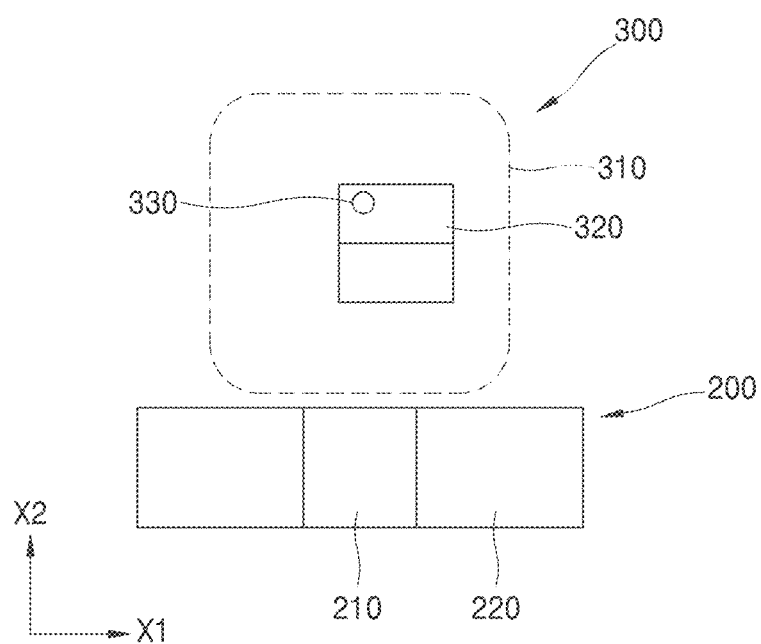
FIG. 15 is a view schematically showing an embodiment of a drive unit.

According to the embodiment illustrated in FIG. 15, the driving unit 200 may include a coil shaft 210 and a coil 220. The coil shaft 210 may be extended in the second direction X2, and the coil 220 may be wound around the coil shaft 210. Therefore, as the electrical signal is applied to the coil 220, the coil 220 may form a magnetic field along the second direction X2. The magnetic field may change the polarity of the magnetic phase in the second direction X2 according to the type of the electrical signal, and, as the magnetic member 320 reacts to the change in the magnetic polarity, the body 310 may rotate around the rotation axis 330.

In the case of the embodiment illustrated in FIG. 15, the coil 220 may be wound over the entire length of the coil shaft 210. However, embodiments are not limited thereto, and the coil 220 may be wound only on a part of the coil shaft 210. The coil shaft 210 may include a plastic material, but embodiments of the present disclosure are not limited thereto. In an embodiment, the coil shaft 210 may include a magnetic material such as metal. Accordingly, even when the application of electricity to the coil 220 is stopped, the magnetism may be maintained in the coil shaft 210 for a period of time.

Figure 16:
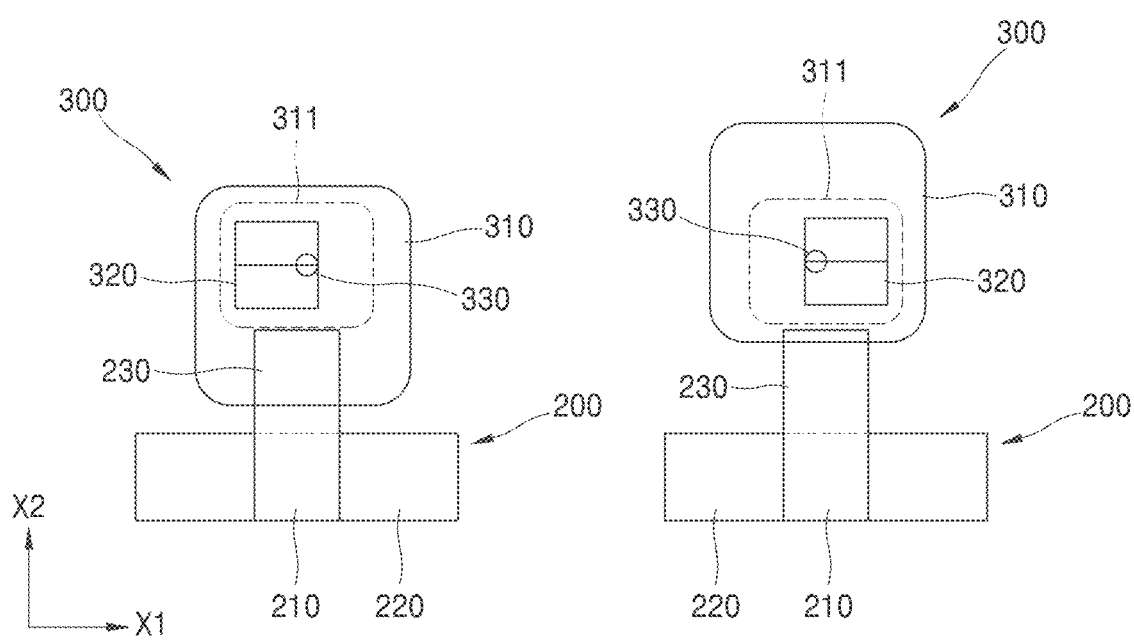
FIG. 16 is a view schematically showing another embodiment of a drive unit.

According to another embodiment illustrated in FIG. 16, the driving unit 200 may further include a support 230 protruding toward the moving unit 300. The support 230 may be coupled to the coil shaft 210 and may extend in the second direction X2, and when the coil shaft 210 includes a magnetic material, the coil shaft 210 and the support 230 may be integrally formed. However, embodiments are not limited thereto, and only the coil shaft 210 includes a magnetic material, and the support 230 may include a non-magnetic material.

Figure 17:
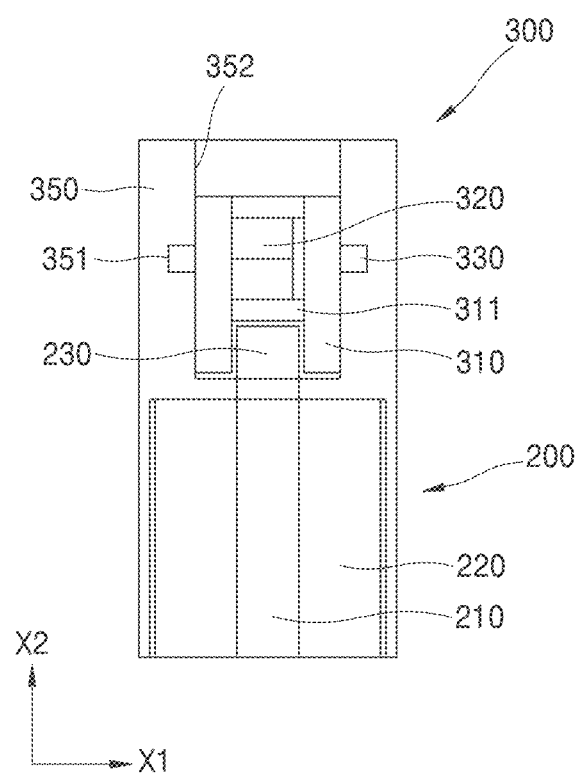
FIG. 17 is a view showing an embodiment of an assembly of a driving unit and a moving unit.

According to the embodiment illustrated in FIG. 16, the body 310 may include a receiving portion 311 in which the magnet member 320 is accommodated, and the receiving portion 311 may be formed to be spaced inwardly from the outer edge of the body 310. In addition, the support 230 may be provided to protrude up to the inside of the body 310 and extend to a position adjacent to the receiving portion 311. For example, as shown in FIG. 17, the receiving portion 311 is provided between a pair of body 310, so that, even when the support 230 is drawn to the inside of the body 310, the rotating of the body 310 may not interfere with the support 230. In this case, the holder 350 allows the body 310 to rotate sufficiently in the inner space portion 352. Thus, as the support 230 protrudes to the inside of the body 310 and extends to a position adjacent to the receiving portion 311, when the body 310 rotates, the support 230 supports the body 310 (for example, the receiving portion 311), whereby the body 310 may be stably rotated.

As the support 230 extends long, the distance between the support 230 and the magnetic member 330 may be maintained close. When the support 230 includes a magnetic material, the support 230 has a certain polarity due to the magnetic force formed by the coil 220. Accordingly, even a small magnetic force may affect the magnetic member 330 more effectively. Therefore, it is possible to enable low-power driving. In addition, even in the case in which the electricity applied to the coil 220 is cut off, the support 230 may retain magnetism. Accordingly, the body 310 may maintain a fixed state without being reversed again even in a state as shown in the right figure of FIG. 16. Thus, the pin 400 may continue to protrude even when the power is not applied. Therefore, it is not necessary to continuously apply electricity to the coil 220 to keep the pin 400 protruding. This may lower the operating power and/or power consumption of the entire apparatus.

Figure 18:
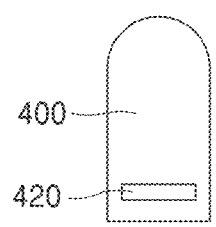
FIG. 18 is a view schematically showing another embodiment of a pin.

Meanwhile, as shown in FIG. 18, a magnetic material 420 may be further formed on the pin 400. The magnetic material 420 may be formed in a plate shape or a shape having a volume. In addition, although not shown in the drawings, the magnetic material may be coated in a film shape on the pin 400, or may be mixed when the pin 400 is formed.

As described above, since the pin 400 includes the magnetic material 420, the pin 400 may be prevented from protruding outside of the expression surface even when power is not applied. When the pin 400 protrudes to the outside of the expression surface and then is driven down to the inside of the expression surface again, the pin 400 may be driven down more easily by the magnetic force of the magnetic material 420 and the magnetic member 320 as well as the movement by the weight of the pin 400.

In this way, since the pin is easily driven down and the protrusion of the pin is prevented without applying power, low-power driving of the entire apparatus becomes possible.

Figure 19A:
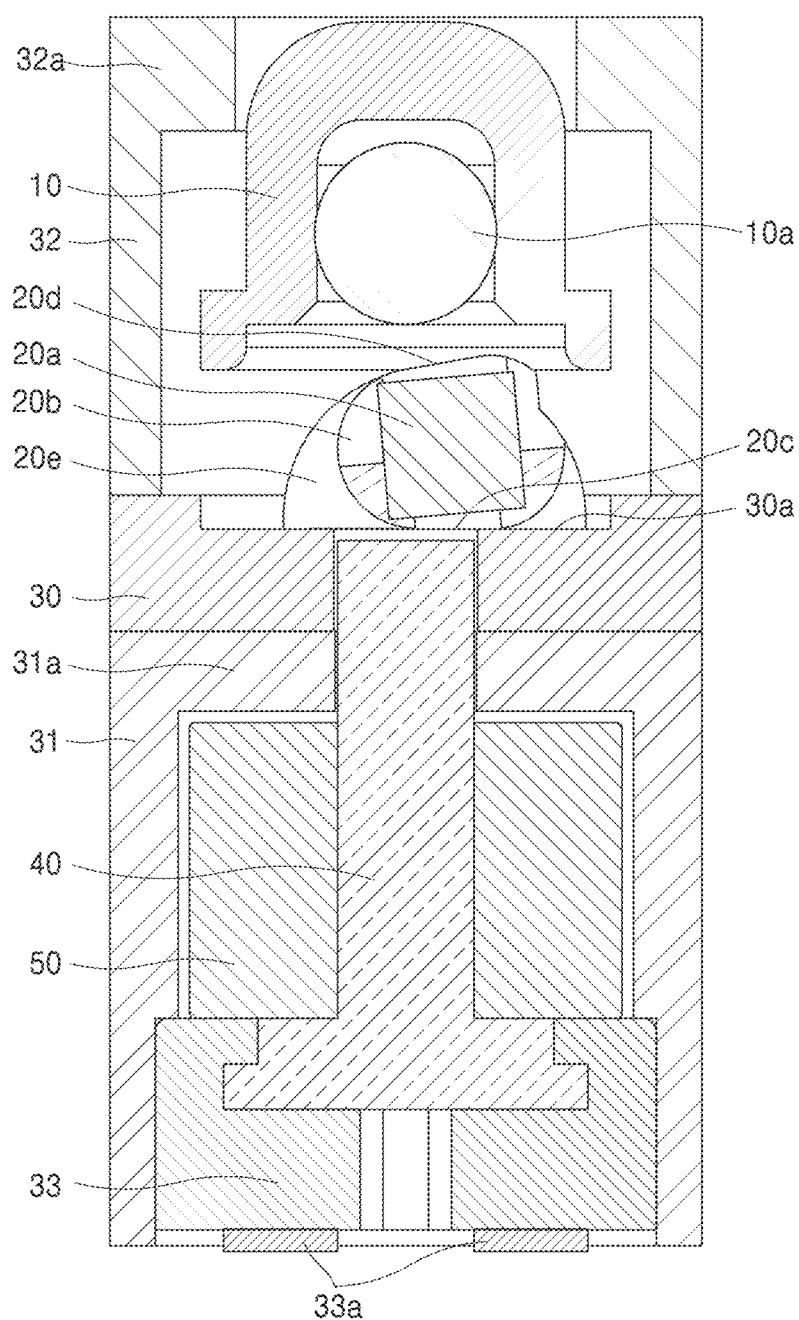
FIGS. 19A and 19B show sectional views of the information output unit according to another embodiment of the disclosure in a pin down state.
Figure 19B:
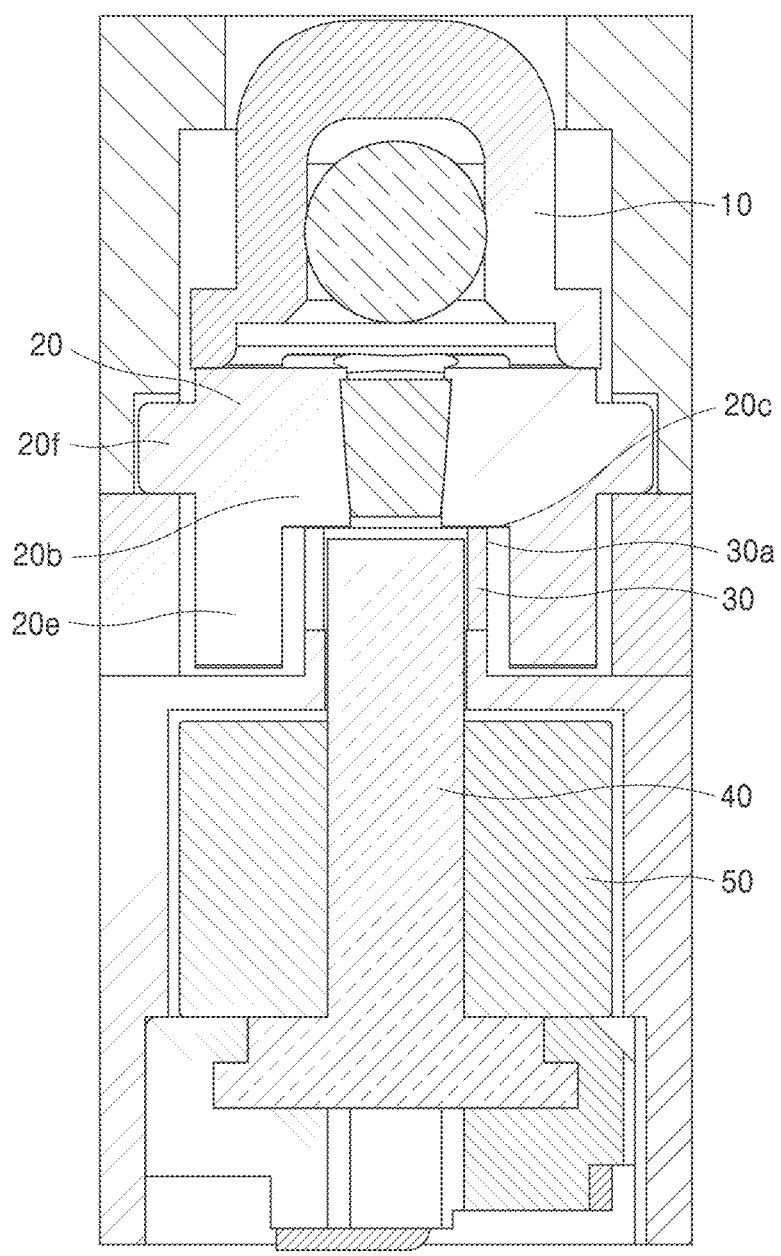
Figure 20A:
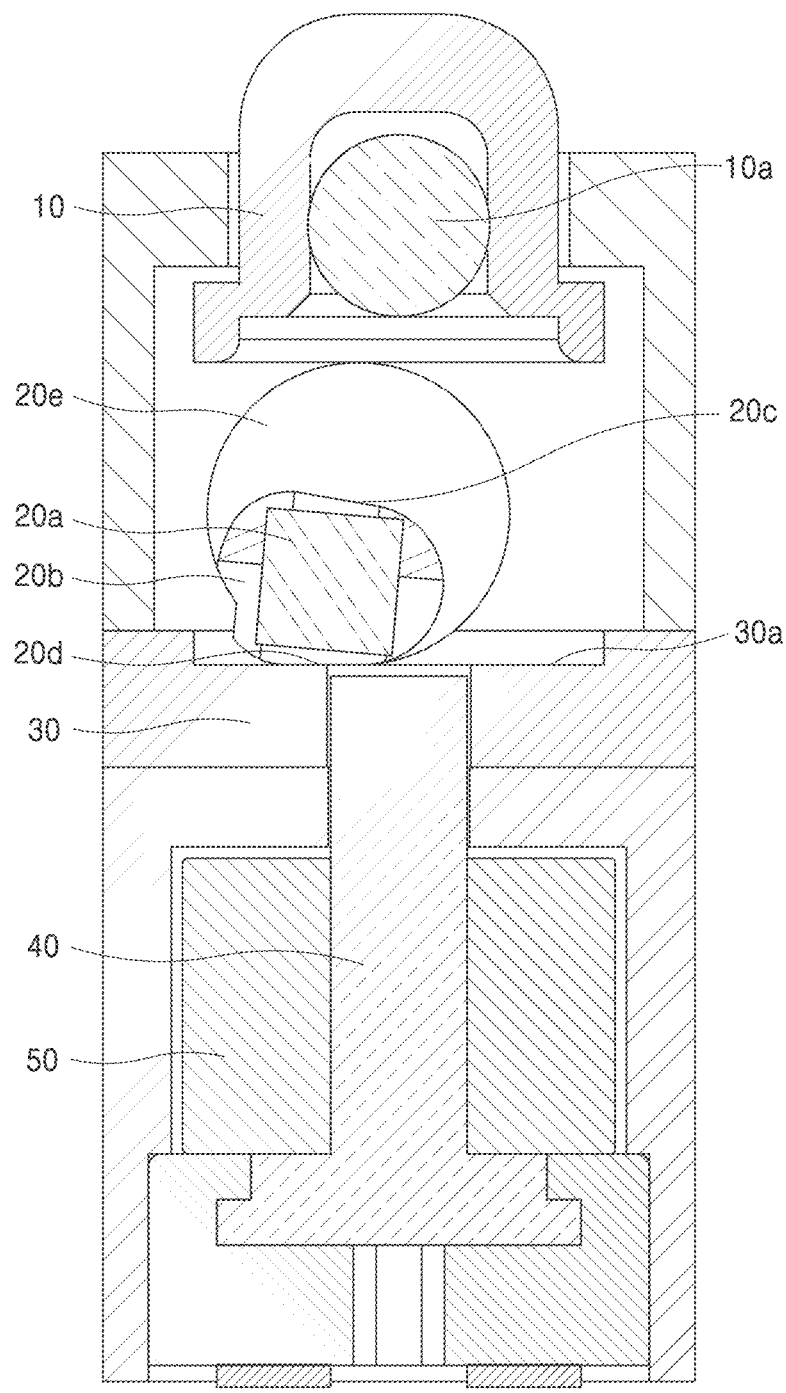
FIGS. 20A and 20B show sectional views of the information output unit according to another embodiment of the disclosure in a pin up state.
Figure 20B:
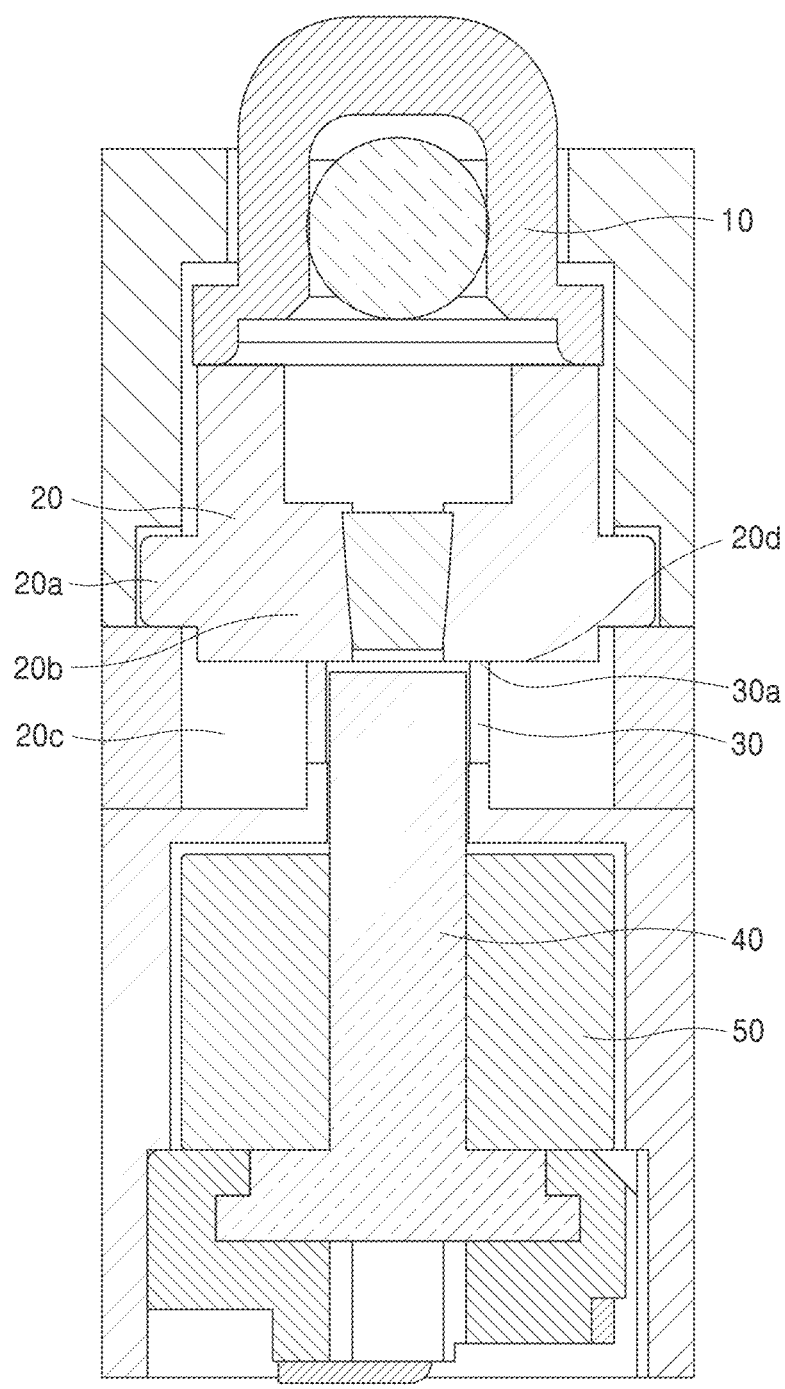

FIG. 19a to FIG. 20b are transparent views schematically showing an information output unit according to another embodiment of the disclosure. FIGS. 19A and 19B show sectional views of the information output unit in a pin down state, and 20A and 20B show sectional views of the information output unit in a pin up state.

Referring to FIG. 19a to FIG. 20b, the information output unit IU may comprise a coil 50, a lower housing 31, a middle housing 30, an upper housing 32, a driving unit 20, and a pin 10.

The pin 10 may be moved according to movement of the driving unit 20, that is, may be moved at least in upper and lower directions based on a lengthwise direction thereof.

The pin 10 may include various materials, for example, an insulating material that is light-weight and has an excellent durability. For example, the pin 10 may include a resin-based organic material. In another example, the pin 10 may include an inorganic material such as a ceramic material.

Also, in another alternative embodiment, the pin 10 may include a material such as metal or glass.

The pin 10 may include a magnetic body 10a therein. The pin 10 may be driven through the driving unit 20 more efficiently by using the magnetic body 10a of the pin 10, and the power consumption may be reduced.

For example, the magnetic body 10a may include a metal, and may include iron as a specific example.

As an alternative embodiment a little magnetic force may be generated between the magnetic body 10a and the magnet 20a inside the driving unit 20, and as a specific example, the pin 10 easily descends when the driving unit 20 descends. It is not preferable that such mutual magnetic forces are large enough to limit the motion of the driving unit 20.

For example, it is not desirable that such mutual magnetic force is large enough to maintain the rising position or the falling position of the pin 10.

In addition, the pin 10 may easily descend when the driving unit 20 descends through the weight of the magnetic body 10a.

The coil 50 may be electrically connected to the terminals 710 of the control plate 700 (referring to FIG. 3) through terminals 33*a* located at a bottom of the lower housing 31. When an electric current flows through the coil 50, a magnetic field may be generated around the coil 50 and/or a core 40.

The driving unit 20 may be moved via the electromagnetic field generated due to the electric current flowing through the coil 50, and a driving force for moving the pin 10 may be provided through the movement of the driving unit 20.

In an alternative embodiment, the core 40 may be further provided, and the coil 50 may be wound around the core 40 and penetrate the lower housing 31 and middle housing 30.

In an alternative embodiment, the core 40 may include a magnetic body, as such, a magnitude of the magnetic field may increase when the magnetic field is generated by the coil 50, and the magnetic field generation may be effectively performed to reduce power consumption of the information output unit IU.

The core 40 may comprise a metal, for example a ferrous material. In an alternative embodiment, the core 40 may comprise nickel and/or cobalt.

In an alternative embodiment, the lower housing 31 and the upper housing 32 may be divided and/or apart from each other.

In another alternative embodiment, the lower housing 31 and the middle housing 30 may be connected to each other via a through hole.

The coil 50 may be arranged in the lower housing 31. In an alternative embodiment, the core 40 may be arranged in the lower housing 31, and a portion of the core 40 may extend into the middle housing 30 via the through hole.

In an alternative embodiment, the housing may include the middle housing 30 between the lower housing 31 and the upper housing 32.

The lower housing 31 and the upper housing 32 may be separated from each other by the middle housing 30.

In an alternative embodiment, the middle housing 30 may have a through hole, through which a portion of the core 40 may extend and pass.

Also, the upper housing 32 includes an entry unit 32*a*. The pin 10 may move through the entry unit 32*a* such that a length of the portion protruding out of the upper housing 32 may change.

The driving unit 20 may be arranged in the upper housing 32 and the middle housing 30. The driving unit 20 may be separated from the coil 50 that is in the lower housing 31.

The driving unit 20 is arranged adjacent to the coil 50 and is driven by the electric current flowing through the coil 50 to perform an angular movement or a rotational movement.

In an alternative embodiment, a magnet 20*a* may be arranged in the driving unit 20, for example, in an internal space of the driving unit 20. For example, the magnet 20*a* may include a magnetic material, for example, a permanent magnet.

The magnet 20*a* may include a first region (e.g., N-pole or S-pole) and a second region (e.g., S-pole or N-pole) having different polarities from each other, and the first region and the second region having the different polarities from each other may be arranged in a Z-axis direction. The magnet 20*a* is inclined in a predetermined range, so as to provide the driving unit 20 with a rotation torque. As such, the driving unit 20 is easily rotated if the rotation of the driving unit 20 is started.

The driving unit 20 includes the driving surface 20*e* on at least an outer surface thereof, and the driving surface 20*e* is formed to support the pin 10 and provides a driving force to the up-and-down movement of the pin 10.

In an alternative embodiment, the driving surface 20*e* of the driving unit 20 is an outer surface that may include a curved surface. In more detail, the driving surface 20*e* of the driving unit 20 may include a boundary line that is formed similarly to a circle.

The driving unit 20 may include a driving controller 20*f*.

A location of driving the driving unit 20 may be controlled by the driving controller 20*f*. For example, when the driving unit 20 is moved by the coil 50, the driving unit 20 may perform an angular or rotational movement about the driving controller 20*f*.

In an alternative embodiment, a central axis of the driving unit 20 and the driving controller 20*f* may not be coincident, but may be eccentric with respect to each other.

In addition, in an alternative embodiment, the magnet 20*a* does not coincide with the central axis of the driving unit 20, and may be arranged, for example, to overlap a region of the driving unit 20.

As such, a torque force with respect to the driving unit 20 may be easily generated and allows the driving unit 20 to perform an angular or rotational movement such that a movement relative to the pin 10 may be performed effectively and a precise expression of the information output unit IU may be improved. Also, power consumption of the information output unit IU may be reduced.

For example, during the angular movement of the driving unit 20, once a force is applied only until the driving unit 20 reaches the critical point, the angular movement may be additionally performed even without additional force applied after that point.

The driving controller 20*f* may be arranged on at least one side surface of the driving unit 20, for example, on each of opposite side surfaces.

In an alternative embodiment, the driving controller 20*f* may protrude, and the protruding shape of the driving controller 20*f* in the alternative embodiment may correspond to a driving groove of the upper housing 32.

In the above embodiment, the driving unit 20 retaining the magnet 20*a* rotates about the rotation shaft (driving controller) 20*f* in order to transition between the pin down and pin up states.

In the pin 10 down state: The pin down flat stop surface 20*c* of the retainer portion 20*b* and the flat stop surface 30*a* of the middle housing 30 contact each other and the stopping state of the driving unit 20 is held.

In an alternative embodiment, no current may be applied to the coil 50 and/or no substantial amount of magnetic force is applied between the magnet 20*a* and the core 40 in the pin down state.

And then current is applied to the coil 50 to make the core 40 and/or the coil 50 be an electromagnet. The electromagnet causes repulsive force between the core 40 and/or the coil 50 and the magnet 20*a* of the driving unit 20 such that the magnet 20*a* rotates about the driving controller (shaft) 20*f* in a counterclockwise direction until the flat stop surface 20*d* of the retainer portion 20*b* contacts the flat stop surface 30*a* of the middle housing 30, which causes the driving unit 20 to stop the rotation.

While the driving unit 20 rotates, the driving surface 20*e* moves the pin 10 up.

In an alternative embodiment, the current applied the coil 50 may not be changed during the rotation of the driving unit 20.

In the pin 10 up state: The flat stop surface 20*d* of the retainer portion 20*b* and the flat stop surface 30*a* of the middle housing 30 contact each other and the stopping state of the driving unit 20 is held.

In an alternative embodiment, no current is applied to the coil 50 in the pin 10 up state, and/or no substantial amount of magnetic force is applied between the magnet 20a and the core 40 in the pin 10 up state.

And then current is applied to the coil 50 to make the core 40 and/or the coil 50 be an electromagnet, and the electromagnet causes repulsive force between the core 40 and/or the coil 50 and the magnet 20a such that the magnet 20a rotates about the driving controller (shaft) 20f in a clockwise direction until the flat stop surface 20c of the retainer portion 20b contacts the flat stop surface 30a of the middle housing 30, which causes the driving unit 20 to stop the rotation.

While the driving unit 20 rotates, the pin 10 moves down along the cam shape profile of the driving surface 20e.

In an alternative embodiment, the current applied the coil 50 may not be changed during the rotation of the driving unit 20.

The above embodiment operates in the pin down state in such a way that the driving unit 20 is held in place by a mechanical structure, i.e., a physical contact between the flat stop surface 20c of the driving unit 20 and the flat stop surface 30a of the middle housing 30. In the pin up state, the driving unit 20 is held in place by the physical contact between the flat stop surface 20d of the driving unit 20 and the flat stop surface 30a of the middle housing 30. Thus, magnetic force for holding the permanent magnet 20a at a position in each of the pin down state or the pin up state is not required as the flat stop surfaces 20c or 20d and 30a mechanically hold the driving unit 20 in the pin down state and the pin up state.

Further, in the pin down state and the pin up state, no current may be applied, no electromagnetic force may be generated, and/or no substantial amount of the magnetic force exists between the magnet 20a and the any other elements for holding the magnet 20a in place.

Figure 21:
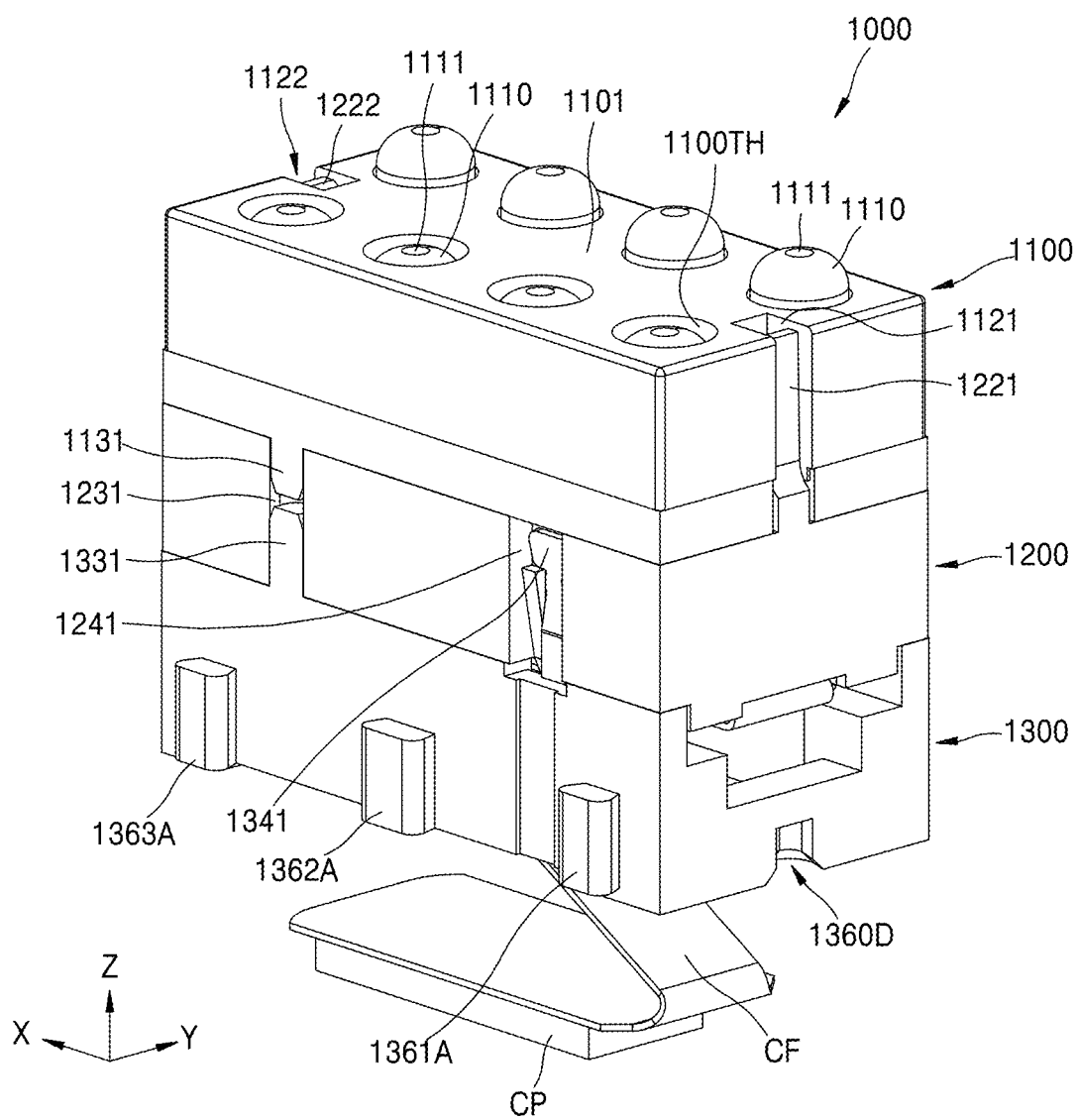
FIG. 21 is a perspective view schematically illustrating an information output apparatus according to an embodiment of the present disclosure.
Figure 22:
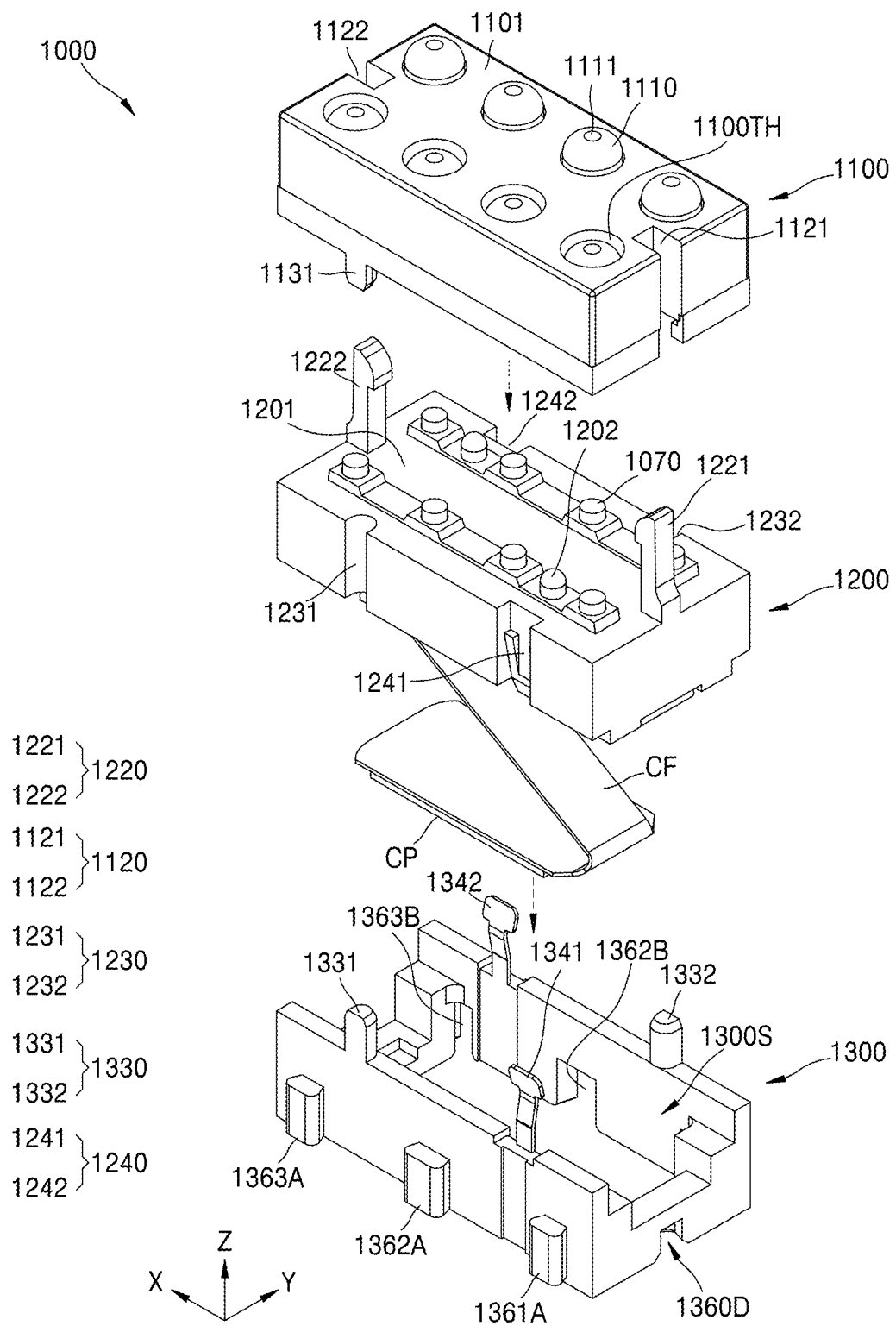
FIG. 22 is an exploded perspective view illustrating the information output apparatus of FIG. 21.

FIG. 21 is a perspective view schematically illustrating an information output apparatus according to an embodiment of the present disclosure, and FIG. 22 is an exploded perspective view illustrating the information output apparatus of FIG. 21.

Referring to FIGS. 21 and 22, an information output apparatus 1000 according to the embodiment may include an upper unit 1100, a lower unit 1200, and a base unit 1300.

First, referring to FIG. 21, the upper unit 1100, the lower unit 1200, and the base unit 1300 may maintain a state in which they are coupled to each other.

In addition, referring to FIG. 22, the upper unit 1100, the lower unit 1200, and the base unit 1300 of the information output apparatus 1000 according to the embodiment may maintain a state in which they are not coupled to each other. Accordingly, convenience of maintenance of the information output apparatus 1000, such as repair or replacement, may be improved.

The upper unit 1100, the lower unit 1200, and the base unit 1300 of the information output apparatus 1000 may be coupled to or separated from each other by using various methods without any separate fastening or coupling member therebetween, and each of them may be easily separated by applying a force to the upper unit 1100, the lower unit 1200, or the base unit 1300 of the information output apparatus 1000, for example, by pushing or pulling at least one region thereof.

The upper unit 1100 may be formed to accommodate one or more expression units 1110, each of which may move up to protrude through an expression through hole 1100TH formed on one region of the top surface 1101 of the upper unit 1100 and move reversely down. The expression unit 1110 may move up and down to allow a user to sense the expression unit 1110, and for example, the user may sense an expression surface 1111 of the expression unit 1110 through tactile sensation, and thus, information interactions such as information recognition or information input by the user may be performed. In an alternative embodiment, the user may visually sense the expression unit 1110.

In an alternative embodiment, the upper unit 1100 may accommodate a plurality of expression units 1110, and for example, as illustrated in FIGS. 21 and 22, the upper unit 1100 may accommodate eight expression units 1110, which may be arranged to be distinguished from each other. The eight expression units 1110 may move independently or simultaneously to perform output or input of a variety of information.

In an alternative embodiment, a plurality of information output apparatuses 1000 may be arranged.

For example, two or more information output apparatuses 1000 may be arranged in parallel in the X-axis direction of FIGS. 21 and 22, and as another example, two or more information output apparatuses 1000 may be arranged in parallel in the Y-axis direction of FIGS. 21 and 22.

The lower unit 1200 may be connected to the upper unit 1100. In addition, the lower unit 1200 may be provided with a driving force providing unit capable of providing a driving force to the expression unit 1110 such that the expression unit 1110 moves, for example, up or down. For example, as illustrated in FIG. 22, eight driving support units 1070 and coil units (not shown) may be provided to correspond to the eight expression units 1110.

The lower unit 1200 may include a top surface 1201 facing the upper unit 1100, and the top surface 1201 of the lower unit 1200 may correspond to the bottom surface of the upper unit 1100. The bottom surface of the upper unit 1100 may be opposite to the top surface 1101 of the upper unit 1100.

The upper unit 1100 and the lower unit 1200 may be coupled to each other by using grooves and extension units corresponding thereto.

For example, the upper unit 1100 may include a groove unit 1120, and a first groove 1121 and a second groove 1122 of the groove unit 1120 may correspond to a first extension unit 1221 and a second extension unit 1222 of an extension unit 1220 of the lower unit 1200, respectively. In an alternative embodiment, a step is be formed in each of the first groove 1121 and the second groove 1122 of the groove unit 1120, and a locking unit is formed on each of the first extension unit 1221 and the second extension unit 1222 of the extension unit 1220, such that a stable coupling force may be maintained after coupling them with each other by applying a force thereto, and the step and the locking unit may be easily separated from each other by applying a sufficient force thereto in the opposite direction. Their detail descriptions will be provided below.

In an alternative embodiment, the upper unit 1100 may include an upper protrusion 1130 formed to face the lower unit 1200, and the upper protrusion 1130 may include a first upper protrusion member 1131 and a second upper protrusion member (not shown).

The lower unit 1200 may include a lower groove 1230 corresponding to the upper protrusion 1130, and in detail, the lower unit 1200 may include a first lower groove 1231 and a second lower groove 1232.

The first upper protrusion member 1131 and the second upper protrusion member (not shown) may correspond to and be inserted into the first lower groove 1231 and the second lower groove 1232, respectively. In this case, the first upper protrusion member 1131 and the second upper protrusion member (not shown) may be formed to be shorter than the first lower groove 1231 and the second lower groove 1232, such that a first base protrusion member 1331 and a second base protrusion member 1332 of a base protrusion 1330 of the base unit 1300 may correspond to the remaining spaces of the first lower groove 1231 and the second lower groove 1232, respectively.

The lower unit 1200 may be connected to the base unit 1300. For example, the lower unit 1200 may be arranged between the upper unit 1100 and the base unit 1300. In detail, the lower unit 1200 may be connected to the upper unit 1100 and the base unit 1300, and in an alternative embodiment, the lower unit 1200 may be detachably coupled to the upper unit 1100 and the base unit 1300.

Accordingly, as illustrated in FIG. 21, the information output apparatus 1000 according to the embodiment may have a shape similar to a structure in which three layers are stacked, or may have a shape similar to the outer surface of a box.

In an alternative embodiment, the base unit 1300 may include the base protrusion 1330 formed to face the lower unit 1200, and the base protrusion 1330 may include the first base protrusion member 1331 and the second base protrusion member 1332.

The first base protrusion member 1331 and the second base protrusion member 1332 of the base protrusion 1330 of the base unit 1300 may correspond to the first lower groove 1231 and the second lower groove 1232 of the lower groove 1230 of the lower unit 1200. For example, they may be arranged to be inserted into one another.

In an alternative embodiment, the base unit 1300 may include a base extension unit 1340 formed to face the lower unit 1200, and a lower corresponding unit 1240 corresponding to the base extension unit 1340, for example, a first lower corresponding member 1241 and a second lower corresponding member 1242, may be formed on one surface of the lower unit 1200.

A first base extension member 1341 of the base extension unit 1340 may correspond to the first lower corresponding member 1241, and may have elasticity to, when a force is applied thereto, be away from the outer surface of the base unit 1300, to firmly correspond to the first lower corresponding member 1241. In addition, the first lower corresponding member 1241 may be in the shape of a groove and have a locking region such as a step formed therein, to allow the first base extension member 1341 to be stably arranged therein.

The base unit 1300 may have a hollow shape so as to have a space portion 1300S at least inside thereof, or, in an alternative embodiment, may have a shape in which an upper portion and a lower portion thereof are opened.

At least a signal connection unit CF may be arranged in the space portion 1300S. The signal connection unit CF is connected to the driving force providing unit accommodated in the lower unit 1200, and for example, may be arranged to apply a signal to a coil unit (not shown) around the driving support unit 1070.

In an alternative embodiment, the signal connection unit CF may contain a flexible material and thus be bendable.

In an alternative embodiment, the signal connection unit CF may be connected to a circuit controller CP. One or more signals may be applied to the driving force providing unit through the circuit controller CP.

As described above, a plurality of information output apparatuses 1000 according to the embodiment may be arranged in one or more directions (the X-axis or Y-axis direction). In this case, the plurality of information output apparatuses 1000 may be connected or coupled to each other.

In an alternative embodiment, they may be connected to each other through the base unit 1300.

The base unit 1300 may include one or more connection protrusion members 1360C, 1361A, 1362A, and 1363A and one or more connection grooves 1360D, 1361B, 1362B, and 1363B.

The connection protrusion members 1360C, 1361A, 1362A, and 1363A and the connection grooves 1360D, 1361B, 1362B, and 1363B of the base unit 1300 may correspond to and be connected or coupled to the connection grooves 1360D, 1361B, 1362B, and 1363B and the connection protrusion members 1363A, 1363B, and 1363C of the adjacent base unit 1300, respectively.

Each of the upper unit 1100, the lower unit 1200, and the base unit 1300 will be described in more detail with reference to the drawings.

FIGS. 23 to 26 are diagrams for describing the upper unit according to an embodiment of the present disclosure.

Figure 23:
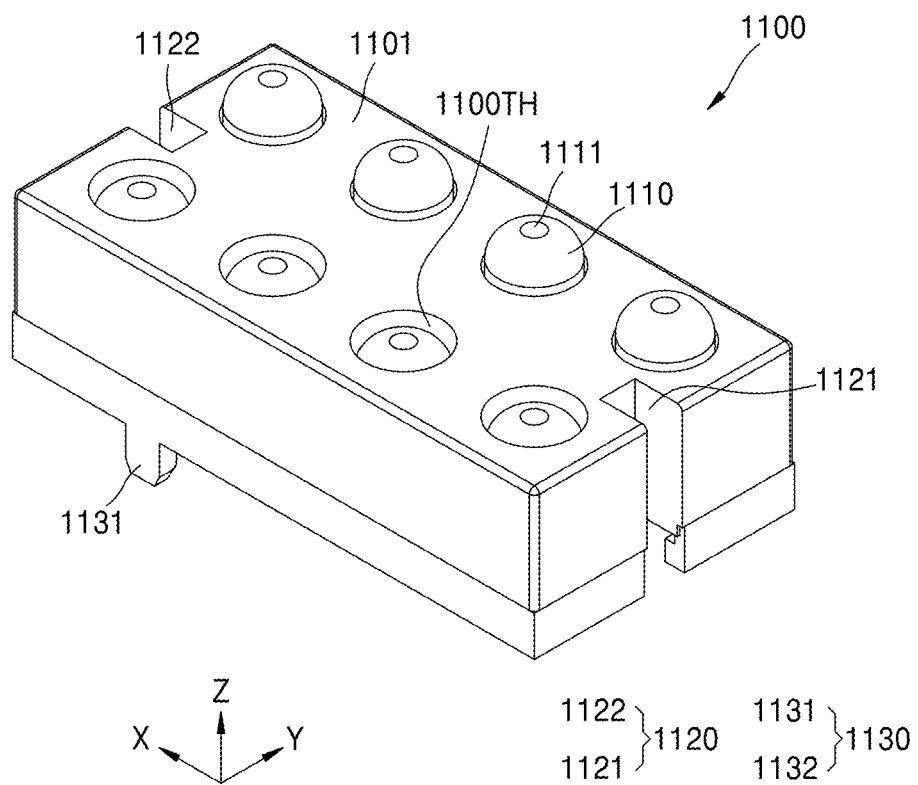
FIGS. 23 to 26 are diagrams for describing an upper unit according to an embodiment of the present disclosure.
Figure 24:
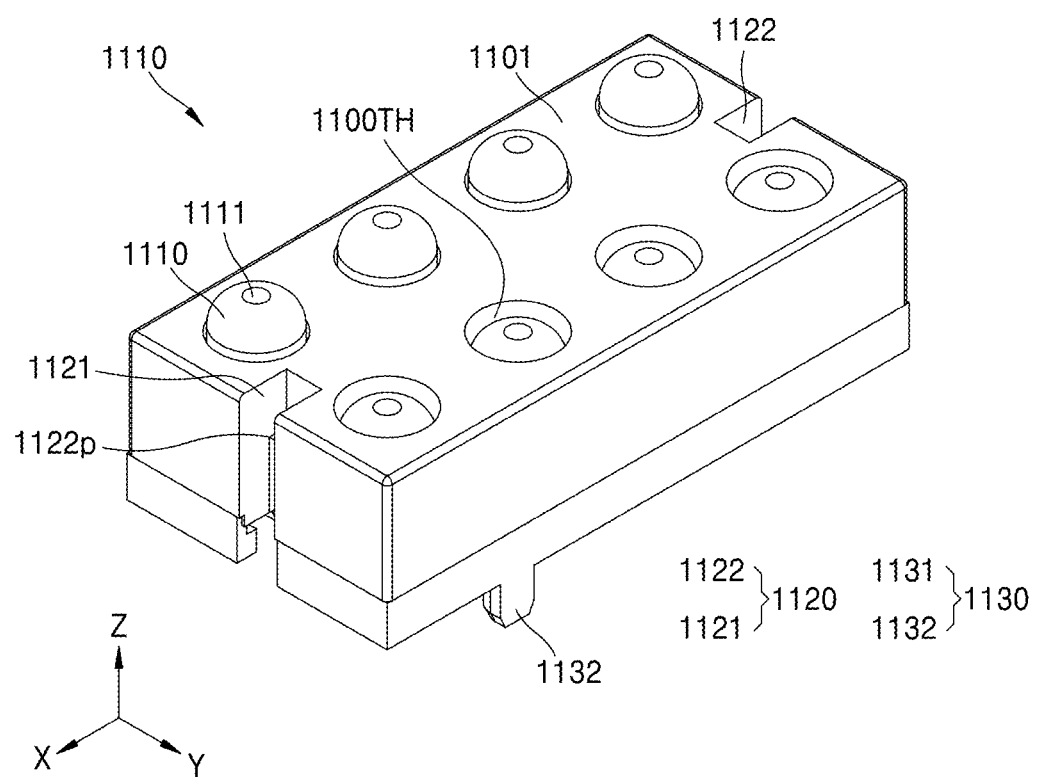
Figure 25:
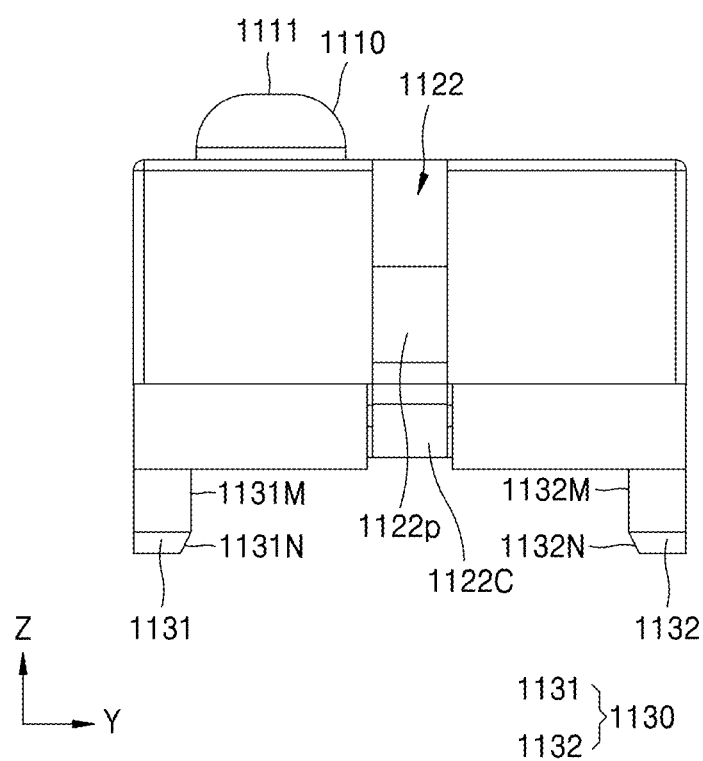
Figure 26:
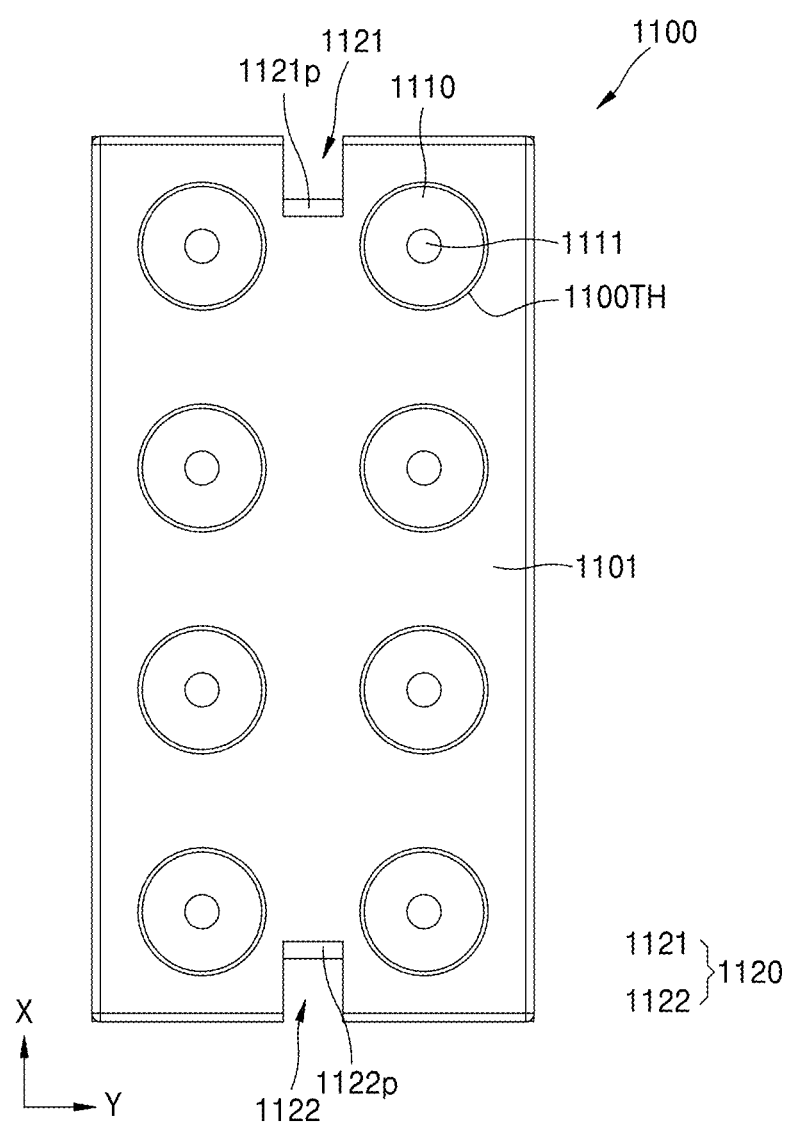

For example, FIG. 23 is a perspective view of the upper unit 1100 of the information output apparatus 1000 of FIG. 21 seen from one direction, FIG. 24 is a perspective view of the upper unit 1100 of FIG. 23 seen from a different direction, FIG. 25 is a side view of the upper unit 1100 of FIG. 23 seen from one side, and FIG. 26 is a plan view of the upper unit 1100 of FIG. 23 seen from the top.

The upper unit 1100 may be formed to accommodate one or more (e.g., eight) expression units 1110, each of which may move upward to protrude through the expression through hole 1100TH formed on one region of the top surface 1101 of the upper unit 1100 and move reversely downward. The top surface 1101 may include a flat surface to allow the user to precisely sense the expression unit 1110 with his/her finger.

The upper unit 1100 may have one or more grooves, for example, grooves for connection with the lower unit 1200.

For example, the upper unit 1100 may include the groove unit 1120, which may include one or more grooves, i.e., the first groove 1121 and the second groove 1122.

The first groove 1121 and the second groove 1122 may be arranged on opposite side surfaces of the upper unit 1100, and in an alternative embodiment, may be arranged to be opposite to each other in the lengthwise direction (e.g., the X-axis direction of FIG. 23) when the width of the upper unit 1100 is defined to be less than the length of the upper unit 1100. In addition, the first groove 1121 and the second groove 1122 may be formed at smaller side surfaces among the side surfaces of the upper unit 1100 to face each other, and accordingly, a force by the user to couple or separate the upper unit 1100 and the lower unit 1200 to or from each other may be effectively applied to facilitate the coupling or separation.

In an alternative embodiment, the first groove 1121 and the second groove 1122 may be formed at overlapping positions, for example, may be formed in parallel along the lengthwise direction of the upper unit 1100.

The first groove 1121 and the second groove 1122 may include a first step 1121P and a second step 1122P, respectively. The first step 1121P and the second step 1122P in the first groove 1121 and the second groove 1122 are curved along the thickness direction of the upper unit 1100 (e.g., the Z-axis direction of FIG. 23) such that the thickness thereof decreases in the downward direction. Locking units may be formed on the first extension unit 1221 and the second extension unit 1222 of the extension unit 1220 of the lower unit 1200 to correspond to the first step 1121P and the second step 1122P of the upper unit 1100, respectively.

In an alternative embodiment, the first groove 1121 and the second groove 1122 may include a first curved surface (not shown) and a second step 1122C, respectively. For example, the first curved surface (not shown) and the second step 1122C may correspond to the first groove 1121 and the second groove 1122, respectively, and may be arranged closer to the lower unit 1200 than the first step 1121P and the second step 1122P, respectively. Through the first curved surface (not shown) and the second step 1122C, each of the first groove 1121 and the second groove 1122 may have a curved inner surface in a region adjacent to the lower unit 1200, and may include a region deeper than adjacent regions according to the shape of the curved inner surface. Accordingly, the lower unit 1200 and the upper unit 1100 may be smoothly connected to each other, and for example, the first extension unit 1221 and the second extension unit 1222 of the extension unit 1220 of the lower unit 1200 may be arranged to easily correspond to the first groove 1121 and the second groove 1122, respectively, and the lower unit 1200 and the upper unit 1100 may be easily separated from each other by simply forcing the first extension unit 1221 and the second extension unit 1222 outward.

In an alternative embodiment, the upper unit 1100 may include the upper protrusion 1130 formed to face the lower unit 1200, and the upper protrusion 1130 may include the first upper protrusion member 1131 and the second upper protrusion member 1132.

The first upper protrusion member 1131 and the second upper protrusion member 1132 may be arranged not in parallel with respect to the widthwise direction of the upper unit 1100.

The first upper protrusion member 1131 and the second upper protrusion member 1132 may have various shapes, and each may protrude from the bottom surface of the upper unit 1100 and may include an outer surface extending from a side surface of the upper unit 1100.

In addition, the first upper protrusion member 1131 and the second upper protrusion member 1132 may include regions having different widths, along the lengthwise direction, for example, the direction toward the lower unit 1200.

For example, the first upper protrusion member 1131 may include a first protrusion main region 1131M and a first protrusion lower region 1131N, which is connected to the first protrusion main region 1131M and is farther away from the top surface 1101 of the upper unit 1100 than the first protrusion main region 1131M. The first protrusion lower region 1131N may include a region having a width less than that of the first protrusion main region 1131M.

For example, the second upper protrusion member 1132 may include a second protrusion main region 1132M and a second protrusion lower region 1132N, which is connected to the second protrusion main region 1132M and is farther away from the top surface 1101 of the upper unit 1100 than the second protrusion main region 1132M. The second protrusion lower region 1132N may include a region having a width less than that of the second protrusion main region 1132M.

The first upper protrusion member 1131 and the second upper protrusion member 1132 may correspond to the first lower groove 1231 and the second lower groove 1232 of the lower groove 1230 of the lower unit 1200, respectively, and the first upper protrusion member 1131 and the second upper protrusion member 1132 may be easily accommodated in the first lower groove 1231 and the second lower groove 1232 of the lower groove 1230 of the lower unit 1200, respectively, through the first protrusion lower region 1131N and the second protrusion lower region 1132N, which have a small width.

FIGS. 27 to 31 are diagrams for describing the lower unit according to an embodiment of the present disclosure.

Figure 27:
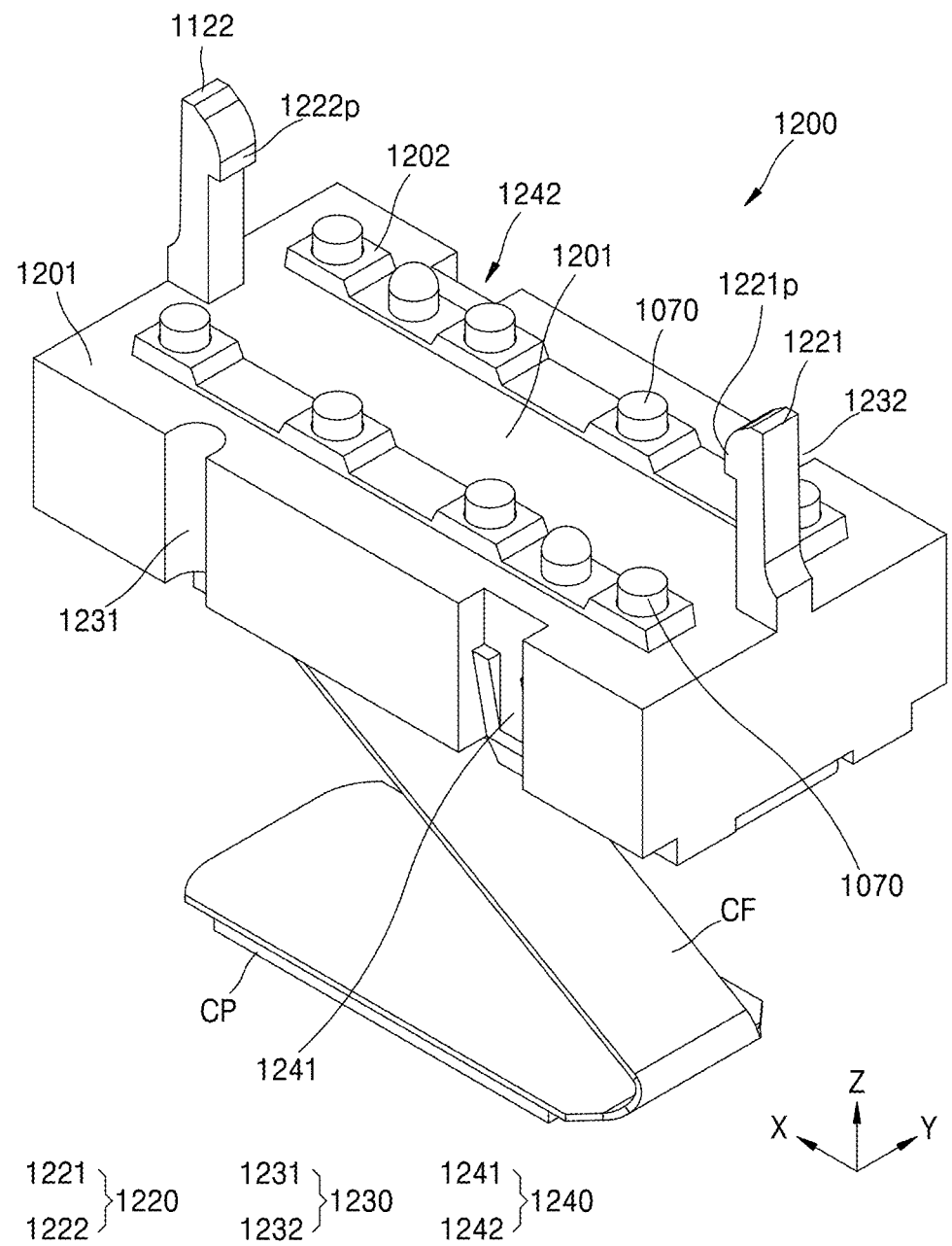
FIGS. 27 to 31 are diagrams for describing an lower unit according to an embodiment of the present disclosure.
Figure 28:
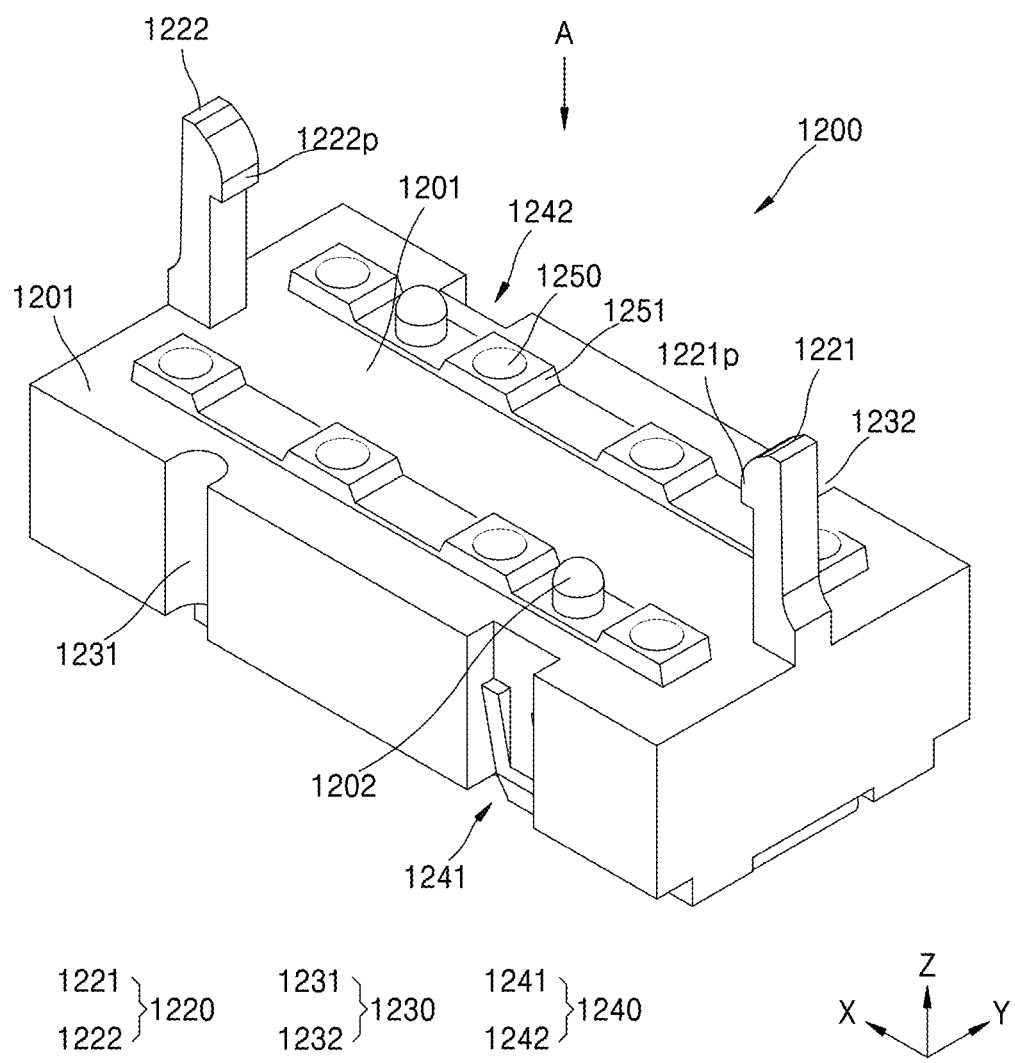

For example, FIG. 27 is a perspective view of the lower unit 1200 of the information output apparatus 1000 of FIG. 21 seen from one direction, and FIG. 28 is a perspective view of the lower unit 1200 of FIG. 27, without the driving support unit 1070, the signal connection unit CF, and the circuit controller CP, seen from a different direction.

Figure 29:
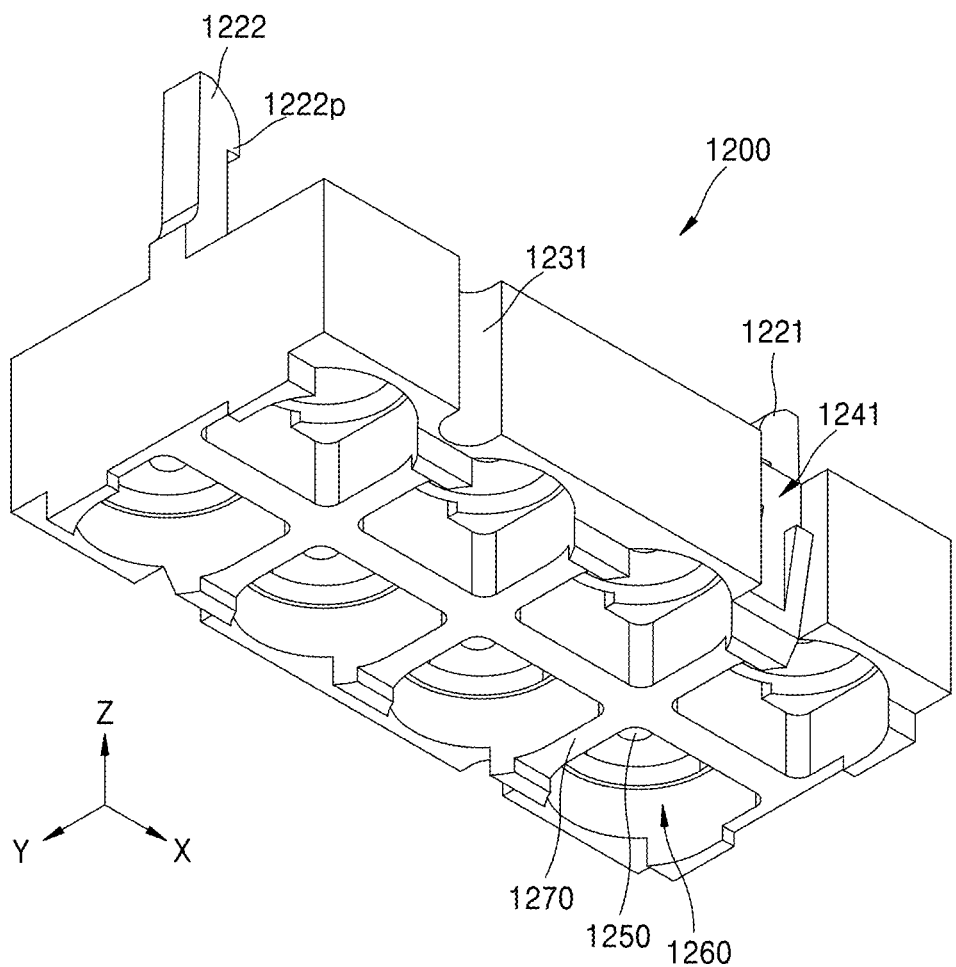
Figure 30:
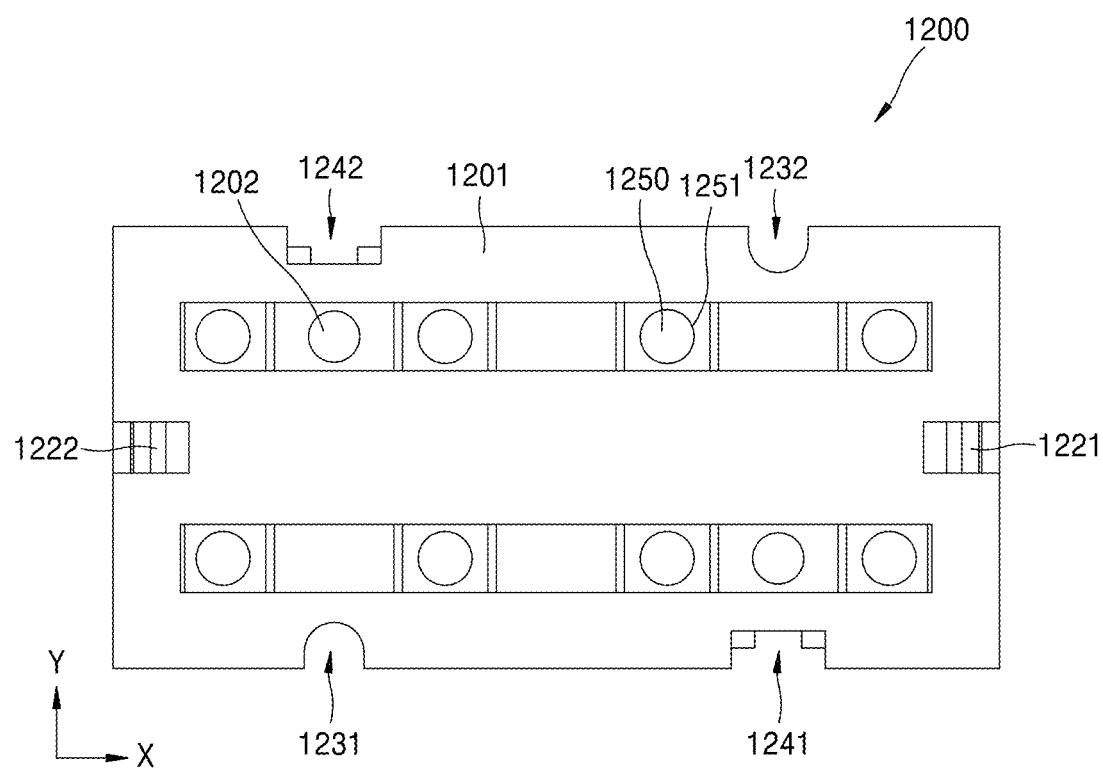
Figure 31:
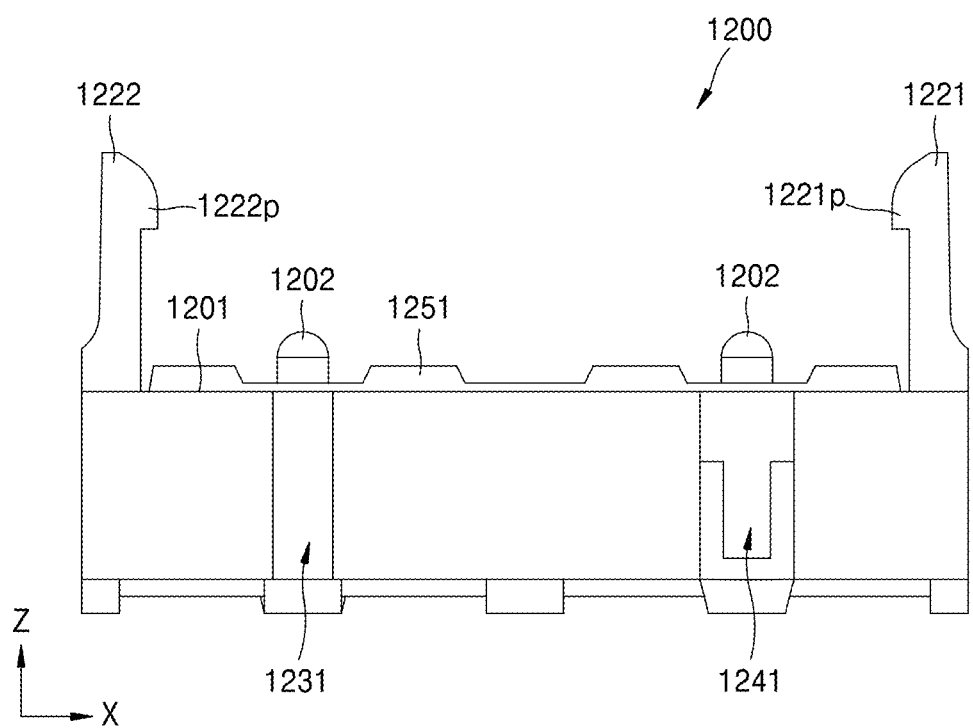

FIG. 29 is a perspective view of the lower unit 1200 of FIG. 28 seen from the bottom, FIG. 30 is a plan view of the lower unit 1200 of FIG. 28 seen from the top, and FIG. 31 is a side view of the lower portion of FIG. 28 seen from one direction.

As illustrated in FIG. 27, the lower unit 1200 may accommodate one or more driving support units 1070 and coil units (not shown) for driving the expression units 1110, for example, eight driving support units 1070 and coil units (not shown) corresponding to eight expression units 1110. The driving force providing unit including the driving support unit 1070 and the coil unit (not shown) will be described in detail below.

The lower unit 1200 may be handled together with the driving force providing unit accommodated therein, and they may be integrally managed to perform a separation or coupling process for replacement. For example, eight driving support units 1070 and coil units (not shown) may be connected to or separated from the upper unit 1100 or the base unit 1300, in a state in which they are accommodated in the lower unit 1200. In an alternative embodiment, the signal connection unit CF and the circuit controller CP may also be provided in the lower unit 1200, and for example, may be directly or indirectly connected to the driving support units 1070 and the coil units (not shown), and thus be handled together with the lower unit 1200.

The lower unit 1200 may include the top surface 1201 facing the upper unit 1100, and the top surface 1201 of the lower unit 1200 may correspond to the bottom surface of the upper unit 1100. The bottom surface of the upper unit 1100 may be opposite to the top surface 1101 of the upper unit 1100.

The lower unit 1200 may include outer surfaces, for example, four side surfaces to have the shape of a box.

In an alternative embodiment, like the lower unit 1200, each of the upper unit 1100 and the base unit 1300 may also include four side surfaces to have the shape of a box, and for example, the side surfaces of the upper unit 1100, the lower unit 1200, and the base unit 1300 may include regions parallel with each other.

The lower unit 1200 may include one or more extension units corresponding to the groove unit 1120 of the upper unit 1100, and for example, the extension unit 1220 of the lower unit 1200 may include the first extension unit 1221 and the second extension unit 1222.

The first extension unit 1221 and the second extension unit 1222 of the extension unit 1220 may correspond to the first groove 1121 and the second groove 1122 of the groove unit 1120 of the upper unit 1100.

The first extension unit 1221 and the second extension unit 1222 may include a first locking unit 1221P and a second locking unit 1222P, respectively. The first extension unit 1221 and the second extension unit 1222 may protrude and extend from the top surface 1201 of the lower unit 1200, and the first locking unit 1221P and the second locking unit 1222P may be formed on the first extension unit 1221 and the second extension unit 1222, respectively, to be spaced apart from the top surface 1201.

For example, the first locking unit 1221P and the second locking unit 1222P may correspond to the first step 1121P and the second step 1122P formed in the first groove 1121 and the second groove 1122 of the upper unit 1100, respectively.

Accordingly, in a state in which the upper unit 1100 and the lower unit 1200 are separated from each other, by applying a force to the upper unit 1100 in the direction toward the lower unit 1200, the first extension unit 1221 and the second extension unit 1222 are accommodated in the first groove 1121 and the second groove 1122, respectively, and the first locking unit 1221P and the second locking unit 1222P are locked with the first step 1121P and the second step 1122P, respectively, to maintain a coupled state.

In addition, in a state in which the upper unit 1100 and the lower unit 1200 are coupled to each other, by applying a force to the first extension unit 1221 and the second extension unit 1222 to force them outward, the first locking unit 1221P and the second locking unit 1222P are released from the first step 1121P and the second step 1122P, respectively, and thus the upper unit 1100 is easily separated from the lower unit 1200, for example, by lifting the upper unit 1100 up from the lower unit 1200.

The top surfaces of the first extension unit 1221 and the second extension unit 1222, for example, the top surfaces of the first step 1121P and the second step 1122P, may include an inclined surface or a curved surface, thereby facilitating the separation.

In an alternative embodiment, the lower unit 1200 may include the lower groove 1230 corresponding to the upper protrusion 1130 of the upper unit 1100, and in detail, may include a first lower groove 1231 and a second lower groove 1232.

In an alternative embodiment, the first lower groove 1231 and the second lower groove 1232 may have curved inner surfaces to allow the first upper protrusion member 1131 and the second upper protrusion member 1132 of the upper unit 1100 to be easily accommodated therein.

In an alternative embodiment, in the lower unit 1200, the lower corresponding unit 1240, for example, a first lower corresponding member 1241 and a second lower corresponding member 1242, corresponding to the base extension unit 1340 may be formed.

The first lower groove 1231 and the first lower corresponding member 1241 may be formed on one side surface of the lower unit 1200, and the second lower groove 1232 and the second lower corresponding member 1242 may be formed on the opposite side surface.

Accordingly, structures for connection with the upper unit 1100 and the base unit 1300 may be formed on one side surface of the lower unit 1200, and structures for connection with upper unit 1100 and the base unit 1300 may be formed on the opposite side surface, so as to improve the connection and coupling forces with the upper unit 1100 and the base unit 1300.

In an alternative embodiment, the first lower groove 1231 may be formed to overlap the second lower corresponding member 1242, and the second lower groove 1232 may be formed to overlap the first lower corresponding member 1241, with respect to the widthwise direction of the lower unit 1200. Accordingly, uniformity in connecting or coupling the upper unit 1100 and the base unit 1300 to the lower unit 1200 may be secured.

The first lower corresponding member 1241 and the second lower corresponding member 1242 may be in the shape of a groove, and may have, for example, an inner side surface having an angled cross section. In addition, the first lower corresponding member 1241 and the second lower corresponding member 1242 may have a step region protruding from one region of the inner side surface having the shape of a groove. Accordingly, the first base extension member 1341 and a second base extension member 1342 of the base unit 1300 may be stably accommodated therein.

In an alternative embodiment, the lower unit 1200 may include one or more convex portions 1202 formed on the top surface 1201, and the upper unit 1100 may include concave portions (not shown) corresponding to the convex portions 1202 of the lower unit 1200. Accordingly, when the upper unit 1100 is connected or coupled to the lower unit 1200, misalignment of the positions of the upper unit 1100 and the lower unit 1200 may be alleviated or prevented.

In an alternative embodiment, the lower unit 1200 may include penetration portions 1250 corresponding to eight driving support units 1070. Accordingly, one region of an upper portion of each of the eight driving support units 1070 may be exposed through the corresponding penetration portion 1250.

In an alternative embodiment, a region including the penetration portion 1250 of the lower unit 1200 may include a protrusion region 1251, and thus a region for arranging a moving member (not shown) or other members corresponding to the driving support unit 1070 in the upper unit 1100 may be easily implemented.

The lower unit 1200 may include one or more accommodation units 1260, for example, eight accommodation units 1260, to which the eight driving support units 1070 and the coil units (not shown) correspond, respectively, and the eight accommodation units 1260 may be connected to the penetration portions 1250, respectively.

In an alternative embodiment, a barrier unit 1270 may be formed to divide the eight accommodation units 1260.

In another alternative embodiment, the accommodation units 1260 may be formed to be connected to each other without the barrier unit 1270.

Figure 32:
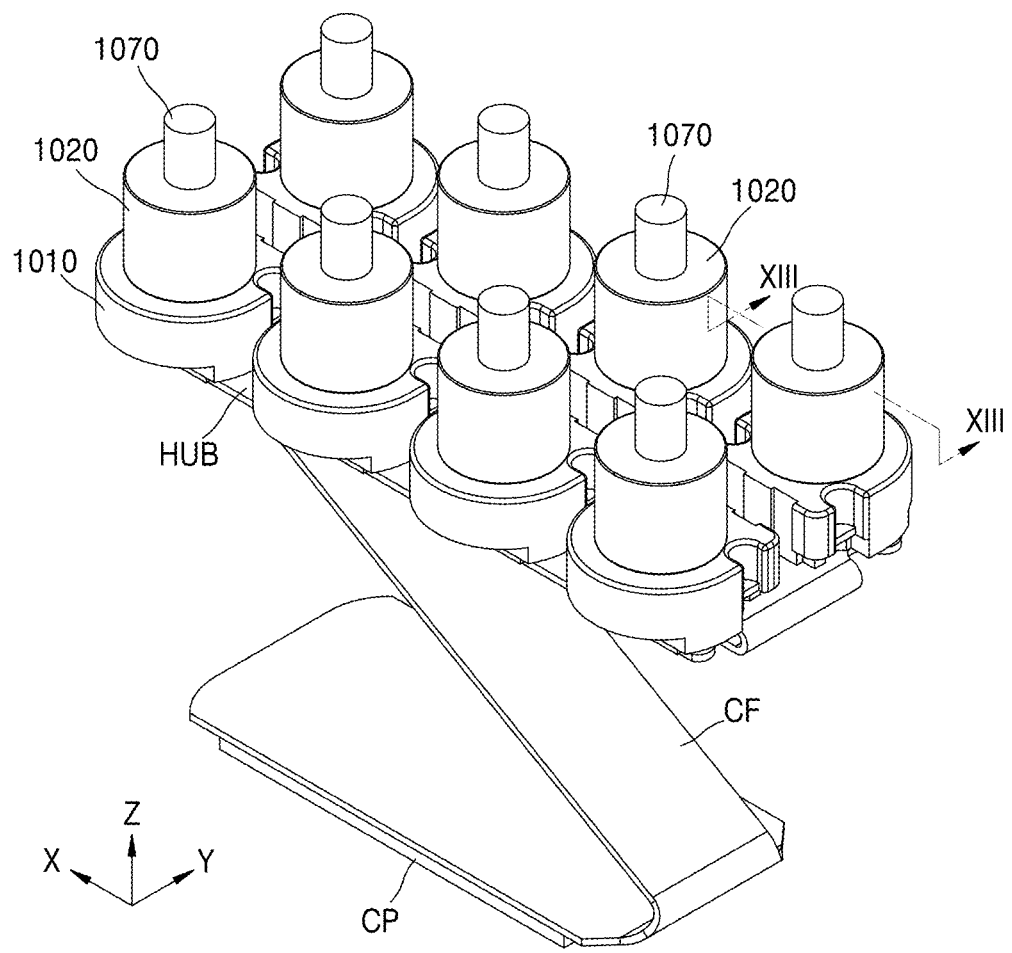
FIG. 32 is an exemplary diagram for describing driving support units and coil units accommodated in a lower unit, according to an embodiment of the present disclosure.
Figure 33:
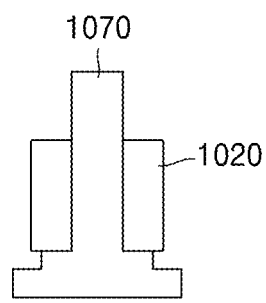
FIG. 33 is a cross-sectional view taken along line XIII-XIII of FIG. 32.
Figure 34:
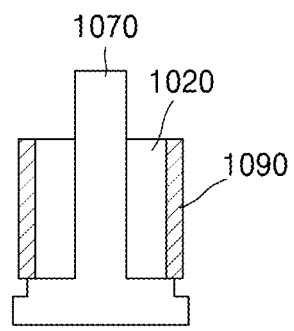
FIG. 34 is a diagram illustrating a modification of a driving support unit and a coil unit of FIG. 33.

FIG. 32 is an exemplary diagram for describing driving support units and coil units accommodated in a lower unit, according to an embodiment of the present disclosure, and FIG. 33 is a cross-sectional view taken along line XIII-XIII of FIG. 32. FIG. 34 is a diagram illustrating a modification of the driving support unit and the coil unit of FIG. 33.

Referring to FIG. 32, eight driving support units 1070 and eight coil units 1020 are arranged.

The coil unit 1020 may be arranged around the driving support unit 1070, and for example, the coil unit 1020 may be wound around the driving support unit 1070.

When an electric field is applied to the coil unit 1020, an electric current may flow through the coil unit 1020 and a magnetic field may be generated around the coil unit 1020. By the magnetic field, a driving force may be provided such that the expression unit 1110 ascends to protrude, or descends in the opposite direction.

The driving support unit 1070 may include an elongated region and may be arranged to pass through the coil unit 1020.

In an alternative embodiment, the driving support unit 1070 may include a magnetic body, and in detail, the entire driving support unit 1070 or one region of the upper end thereof may include the magnetic body. Accordingly, the magnitude of a magnetic field generated through the coil unit 1020 may increase, and the magnetic field may be efficiently generated to improve the efficiency of providing a driving force for a movement of the expression unit 1110.

In addition, in an alternative embodiment, the driving support unit 1070 may include metal. For example, the driving support unit 1070 may include iron. As another example, the driving support unit 1070 may include nickel or cobalt.

In an alternative embodiment, a pedestal unit 1010 may be arranged below the driving support unit 1070.

In an alternative embodiment, the signal connection unit CF may be provided, and a signal may be applied to the coil units 1020 through the signal connection unit CF. For example, one or more signals from the circuit controller CP may be applied to the coil units 1020 through the signal connection unit CF, and in detail, signals may be respectively applied to the eight coil units 1020 corresponding to the eight driving support units 1070, and as another example, the same signal may be simultaneously applied to the eight coil units 1020.

In an alternative embodiment, a circuit board HUB may be further provided to connect the signal connection unit CF to the eight coil units 1020.

The signal connection unit CF may have various shapes, for example, may be formed of a flexible material to be bendable at least once, and thus may be folded twice as illustrated in FIG. 32, so as to improve the overall space utilization of the information output apparatus 1000.

In an alternative embodiment, referring to FIG. 33, the driving support unit 1070 may have a plate-like wide support region formed at a lower portion of an elongated region, so as to facilitate the arrangement of the coil unit 1020.

Referring to FIG. 34, in an alternative embodiment, an outer member 1090 may be further provided on the outer surface of the coil unit 1020. The outer member 1090 may have various shapes, for example, the shape of a hollow pillar surrounding the coil unit 1020, in detail, a cylindrical shape.

Through the outer member 1090, interference between the surrounding space and a magnetic field generated through the coil unit 1020 may be alleviated or prevented.

The outer member 1090 may be formed of various materials, and may contain a magnetic body, for example, iron, nickel, or other various metallic magnetic materials.

Figure 35:
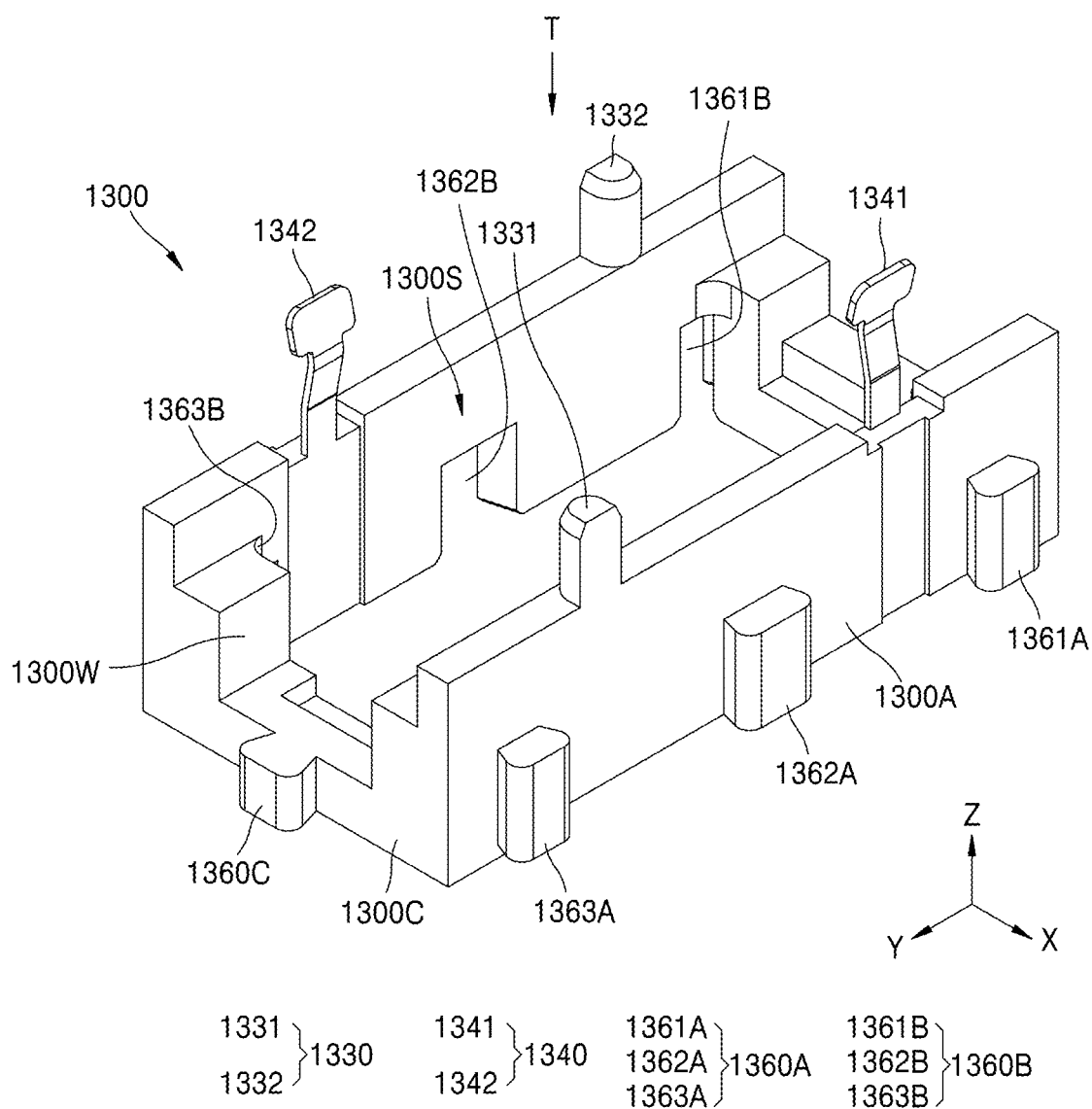
FIGS. 35 to 37 are diagrams for describing a base unit according to an embodiment of the present disclosure.
Figure 36:
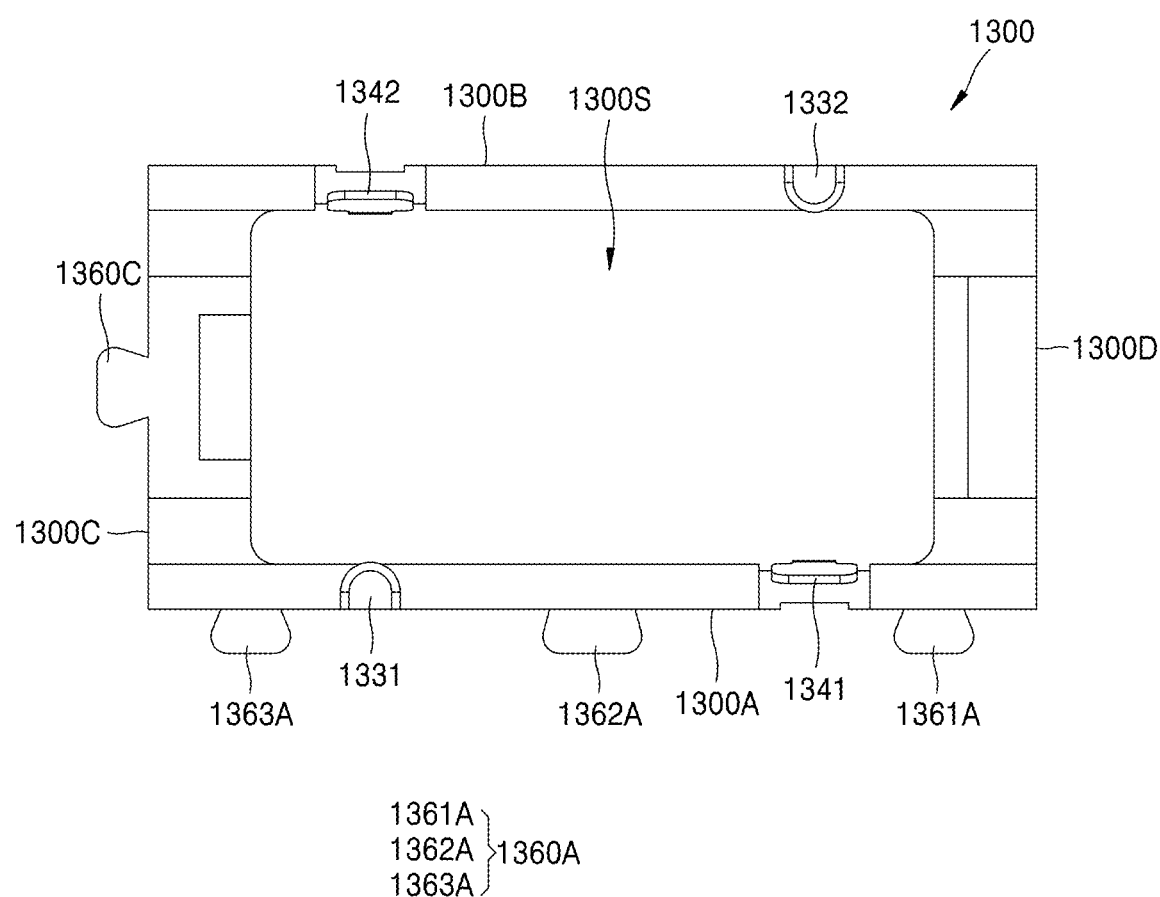
Figure 37:
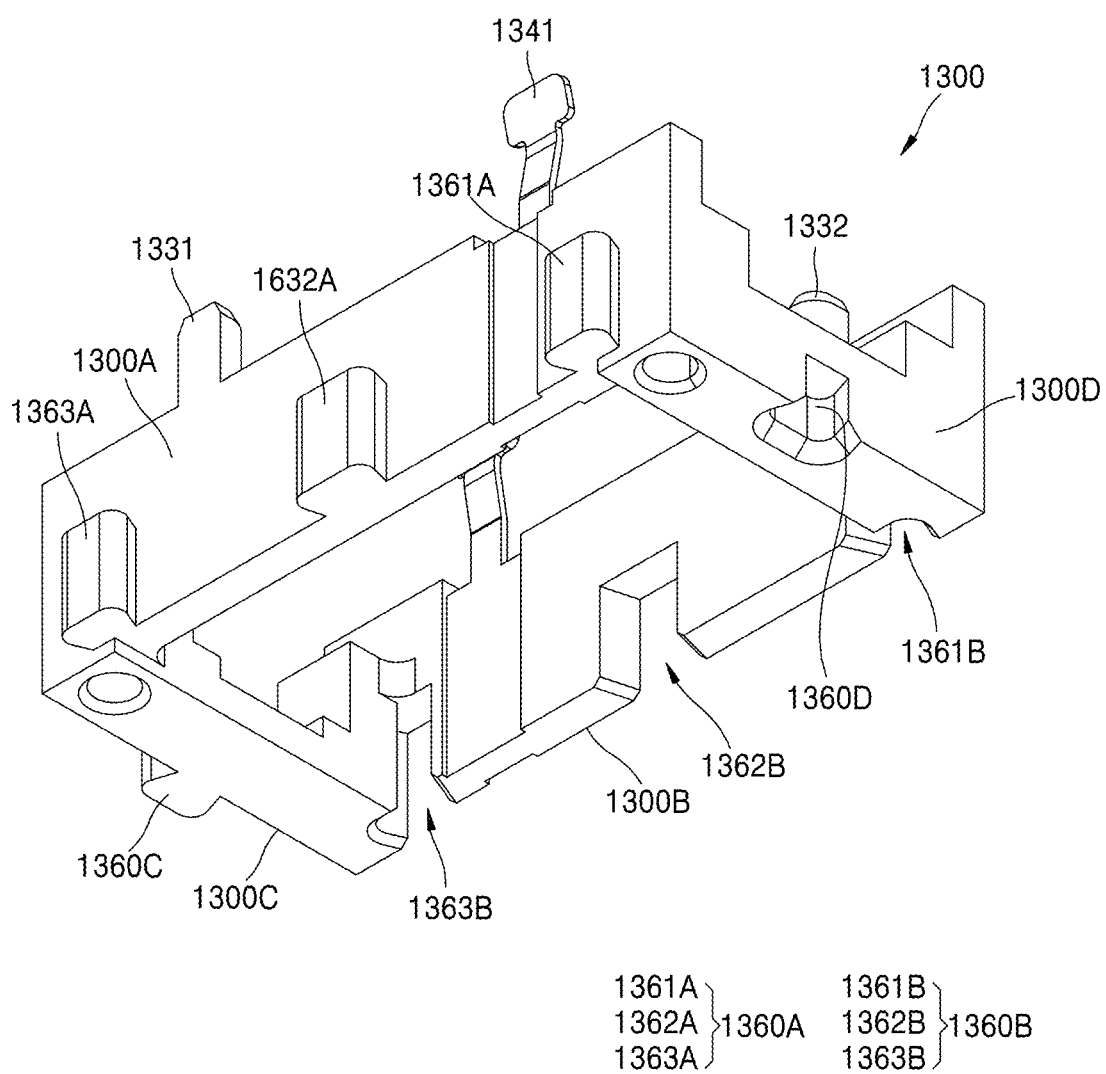

FIGS. 35 to 37 are diagrams for describing the base unit according to an embodiment of the present disclosure. For example, FIG. 35 is a perspective view of the base unit 1300 of the information output apparatus 1000 of FIG. 21 seen from one direction, FIG. 36 is a plan view of the base unit 1300 of FIG. 35 seen from T, and FIG. 37 is a perspective view of the base unit 1300 of FIG. 35 seen from a different direction.

The base unit 1300 may be formed to be connectable to the lower unit 1200.

The base unit 1300 may have a hollow shape so as to have the space portion 1300S at least inside thereof, or, in an alternative embodiment, may have a shape in which an upper portion and a lower portion thereof are opened.

For example, the base unit 1300 may include a first side surface 1300A, a second side surface 1300B, a third side surface 1300C, and a fourth side surface 1300D, and the space portion 1300S may be formed to be surrounded by them. The first side surface 1300A may face the second side surface 1300B, and the third side surface 1300C may face the fourth side surface 1300D. The first side surface 1300A and the second side surface 1300B of the base unit 1300 may extend in the lengthwise direction of the base unit 1300, and the third side surface 1300C and the fourth side surface 1300D of the base unit 1300 may extend in the widthwise direction of the base unit 1300.

The signal connection unit CF or the circuit controller CP may be arranged to correspond to the space portion 1300S.

The base unit 1300 may include one or more base protrusion members formed to face the lower unit 1200 and corresponding to the lower groove 1230 of the lower unit 1200. For example, the base unit 1300 may include the base protrusion 1330 formed to face the lower unit 1200, and the base protrusion 1330 may include the first base protrusion member 1331 and the second base protrusion member 1332.

The first base protrusion member 1331 and the second base protrusion member 1332 may correspond to the first lower groove 1231 and the second lower groove 1232 of the lower unit 1200, respectively. The first base protrusion member 1331 and the second base protrusion member 1332 may include curved surfaces to correspond to inner surfaces of the first lower groove 1231 and the second lower groove 1232 of the lower unit 1200, respectively.

The first base protrusion member 1331 and the second base protrusion member 1332 may correspond to the first upper protrusion member 1131 and the second upper protrusion member 1132 of the upper unit 1100, in the first lower groove 1231 and the second lower groove 1232 of the lower unit 1200, respectively.

The first base protrusion member 1331 and the second base protrusion member 1332 may have various shapes, may protrude from the top surface of the base unit 1300, and may include outer side surfaces formed to extend from side surfaces of the base unit 1300, for example, the first side surface 1300A and the second side surface 1300B of the base unit 1300, respectively.

The base unit 1300 may include one or more base extension members formed to face the lower unit 1200 and corresponding to the lower corresponding unit 1240 of the lower unit 1200. For example, the base unit 1300 may include the base extension unit 1340 formed to face the lower unit 1200, and the base extension unit 1340 may include the first base extension member 1341 and the second base extension member 1342.

The first base extension member 1341 and the second base extension member 1342 may correspond to the first lower corresponding member 1241 and the second lower corresponding member 1242 of the lower corresponding unit 1240 of the lower unit 1200, respectively.

Each of the first base extension member 1341 and the second base extension member 1342 may have an elongated region and a region formed at an end thereof to be wider than the elongated region.

The wider regions of the ends of the first base extension member 1341 and the second base extension member 1342 may correspond to the step regions of the first lower corresponding member 1241 and the second lower corresponding member 1242 of the lower corresponding unit 1240 of the lower unit 1200, respectively. Accordingly, after the lower unit 1200 is arranged to be connected to the base unit 1300, the lower unit 1200 and the base unit 1300 may maintain a state in which they are effectively coupled to each other. In addition, in a state in which the wider regions of the ends of the first base extension member 1341 and the second base extension member 1342 are locked with the step regions of the first lower corresponding member 1241 and the second lower corresponding member 1242, respectively, the wider regions may be released from the step regions by applying a force, for example, by forcing the first base extension member 1341 and the second base extension member 1342 outward, and then the lower unit 1200 may be separated from the base unit 1300 by lifting up the lower unit 1200.

In an alternative embodiment, the first base extension member 1341 and the second base extension member 1342 may be formed separately from other regions of the base unit 1300, and for example, may be formed separately and then connected to the side surfaces of the base unit 1300, respectively.

Accordingly, the first base extension member 1341 and the second base extension member 1342 may be formed of various materials, for example, a metal material, and thus, delivery of various electrical signals to adjacent regions may be achieved.

As described above, a plurality of information output apparatuses 1000 according to the embodiment may be arranged in one or more directions (the X-axis or Y-axis direction). In this case, the plurality of information output apparatuses 1000 may be connected or coupled to each other.

In an alternative embodiment, they may be connected to each other through the base unit 1300, in detail, by using a plurality of connection protrusion members and a plurality of connection grooves.

For example, the connection protrusion members and the connection grooves may be formed on the first side surface 1300A, the second side surface 1300B, the third side surface 1300C, and the fourth side surface 1300D of the base unit 1300.

In an alternative embodiment, a connection protrusion member 1360A may be formed on the first side surface 1300A of the base unit 1300, for example, a first connection protrusion member 1361A, a second connection protrusion member 1362A, and a third connection protrusion member 1363A may be formed on the first side surface 1300A.

A connection groove 1360B may be formed on the second side surface 1300B of the base unit 1300, for example, a first connection groove 1361B, a second connection groove 1362B, and a third connection groove 1363B may be formed on the second side surface 1300B.

In addition, in an alternative embodiment, a fourth connection protrusion member 1360C may be formed on the third side surface 1300C of the base unit 1300, and a fourth connection groove 1360D may be formed on the fourth side surface 1300D of the base unit 1300.

A plurality of information output apparatuses 1000 according to the embodiment may be arranged in the X-axis or Y-axis direction to handle various types and pieces of information.

In this case, a plurality of base units 1300 arranged in the X-axis or Y-axis direction may be connected to each other to maintain a stable state.

For example, two adjacent base units 1300 arranged in the X-axis direction may be connected or coupled to each other by inserting the first connection protrusion member 1361A, the second connection protrusion member 1362A, and the third connection protrusion member 1363A of the first side surface 1300A of one base unit 1300, into the first connection groove 1361B, the second connection groove 1362B, and the third connection groove 1363B of the second side surface 1300B of the other base unit 1300, respectively.

As another example, two adjacent base units 1300 arranged in the Y-axis direction may be connected or coupled to each other by inserting the fourth connection protrusion member 1360C of the third side surface 1300C of one base unit 1300 into the fourth connection groove 1360D of the fourth side surface 1300D of the other base unit 1300.

In an alternative embodiment, a window region 1300W having an open region may be formed on one side surface of the base unit 1300, for example, the third side surface 1300C, and window region 1300W may dissipate heat generated when the information output apparatus 1000 is driven. In addition, the window region 1300W may be used for inspecting and checking or repairing a region of the lower unit 1200 or the signal connection unit CF.

Figure 38:
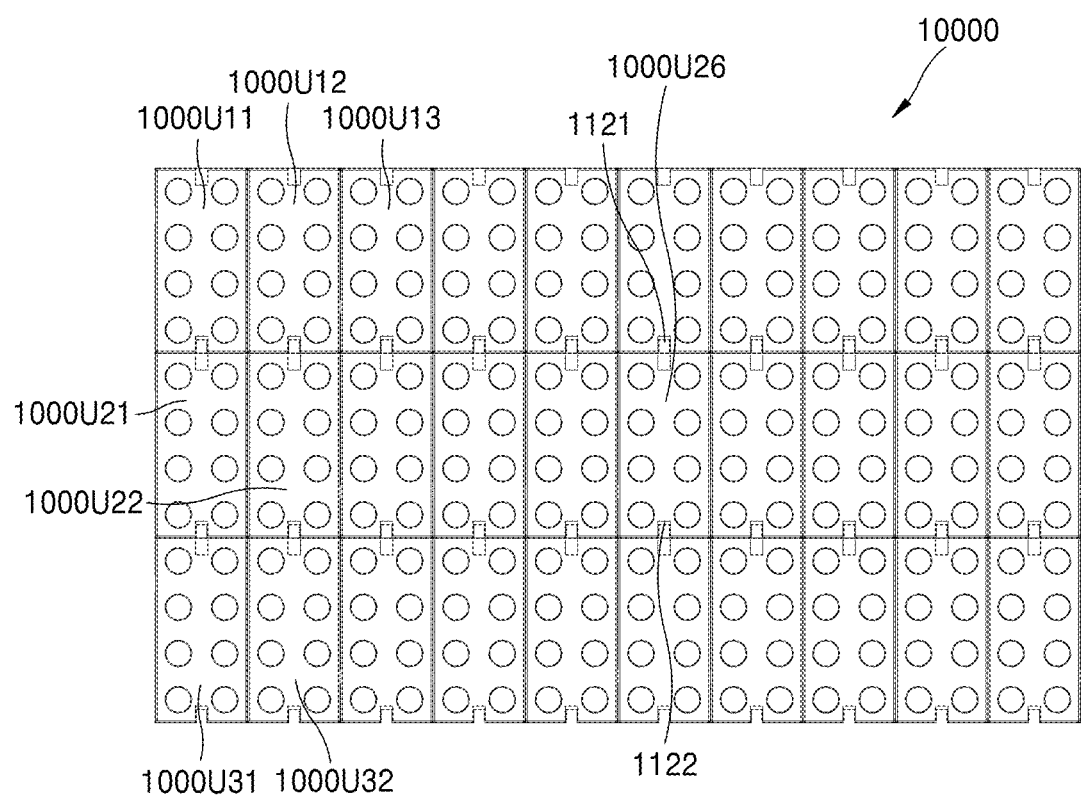
FIGS. 38 to 40 are diagrams for describing an information output apparatus according to another embodiment of the present disclosure.
Figure 39:
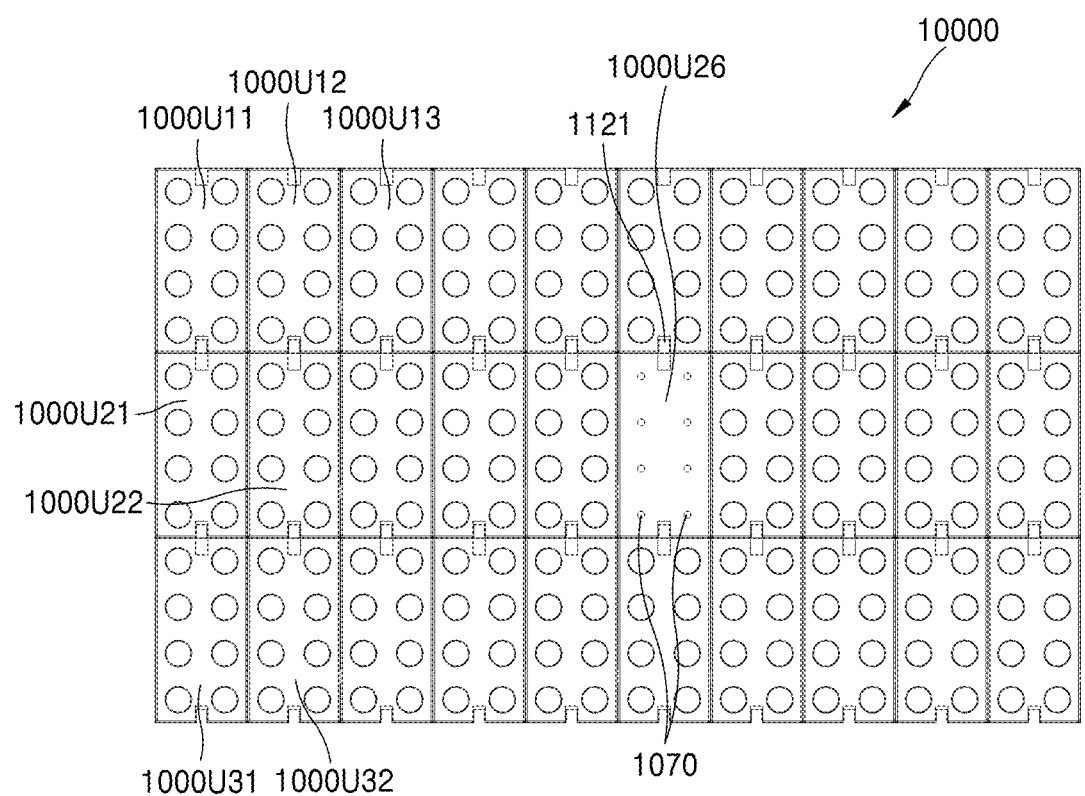
Figure 40:
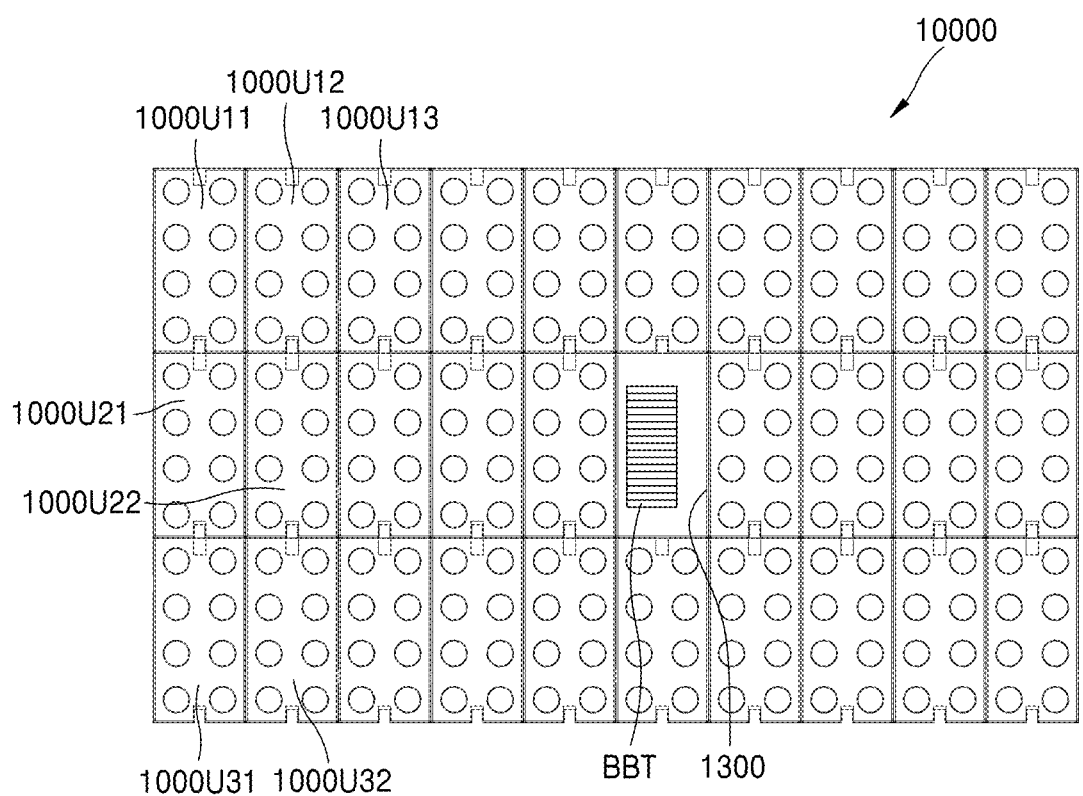

FIGS. 38 to 40 are diagrams for describing an information output apparatus according to another embodiment of the present disclosure.

For example, an information output apparatus 10000 of FIGS. 38 to 40 may include a plurality of information output apparatuses 1000 of FIG. 1 arranged in a plurality of arrays, for example, in a matrix form.

The information output apparatus 10000 may include a controller (not shown) for overall control of the plurality of information output apparatuses 1000, and may output different pieces of information or the same information, if necessary, to each of the plurality of information output apparatuses 1000 according to a set condition. Accordingly, the user may sense or input information from or onto a large use surface.

In detail, referring to FIG. 38, the information output apparatus 10000 may include a plurality of information output apparatuses 1000U11, 1000U12, . . . arranged in the first row in one direction, a plurality of information output apparatuses 1000U21, 1000U22, . . . , 1000U26, . . . arranged in the second row in one direction, and a plurality of information output apparatuses 1000U31, 1000U32, . . . arranged in the third row in one direction.

The first groove 1121 of one information output apparatus 1000 and the second groove 1122 of another information output apparatus 1000, which are adjacent to each other in the lengthwise direction thereof, form a large space, and thus, convenience of management by a user or by using a tool may be improved.

FIGS. 39 and 40 illustrate an example of management of the information output apparatus 10000.

FIG. 39 illustrates a state in which the upper unit 1100 of one information output apparatus 1000U26 is separated from the lower unit 1200 and then removed. The upper unit 1100 coupled to the upper unit 1200 may be easily separated therefrom after the first extension unit 1221 and the second extension unit 1222 of the extension unit 1220 are forced outward to separate the first locking unit 1221P and the second locking unit 1222P from the first step 1121P and the second step 1122P, respectively.

FIG. 40 illustrates a state in which the lower unit 1200 of the information output apparatus 1000U26 is separated from the base unit 1300 and then removed. The lower unit 1200 coupled to the base unit 1300 may be easily separated therefrom after first base extension member 1341 and second base extension member 1342 of the base unit 1300 are forced outward to be separated from the first lower corresponding member 1241 and the second lower corresponding member 1242, respectively.

In an alternative embodiment, the base unit 1300 may include a circuit or power source unit for driving the information output apparatus 10000, and the circuit or power source unit may include a connecting region BBT and may be exposed to correspond to an inner space of the base unit 1300 when the lower unit 1200 is removed.

The information output apparatus according to the embodiment includes one or more expression units, and a plurality of information output apparatuses may be arranged in two intersecting directions and may be easily coupled to or separated from each other.

In addition, the base unit, the lower unit, and the upper unit of one information output apparatus may be easily connected or coupled to and separated from each other.

Accordingly, the information output apparatus may be more conveniently used and managed.

Meanwhile, various methods of transferring a driving force may be used in the embodiments described above with reference to FIGS. 21 to 40, and for example, one of the structures of FIGS. 6 to 20 or one of the embodiments described above with reference to FIGS. 6 to 20 may be selectively applied.

At least one region or the entire region of the moving unit 300 of the embodiments described above with reference to FIGS. 7 to 11 may be accommodated in the upper unit 1100. When the moving unit 300 is accommodated in the upper unit 1100, a holder region corresponding to the moving unit 300 may be formed inside the upper unit 1100.

For example, the body 310 of the moving unit 300 may be mounted in the holder region 350 illustrated in FIG. 12, which may include a support groove 351 therein in which the body 310 is accommodated and the rotation shaft 330 of the body 310 is supported. The holder region 350 may have a sufficient space therein to allow the body 310 to rotate in a state in which the rotation shaft 330 is supported by the support groove 351.

Figure 41:
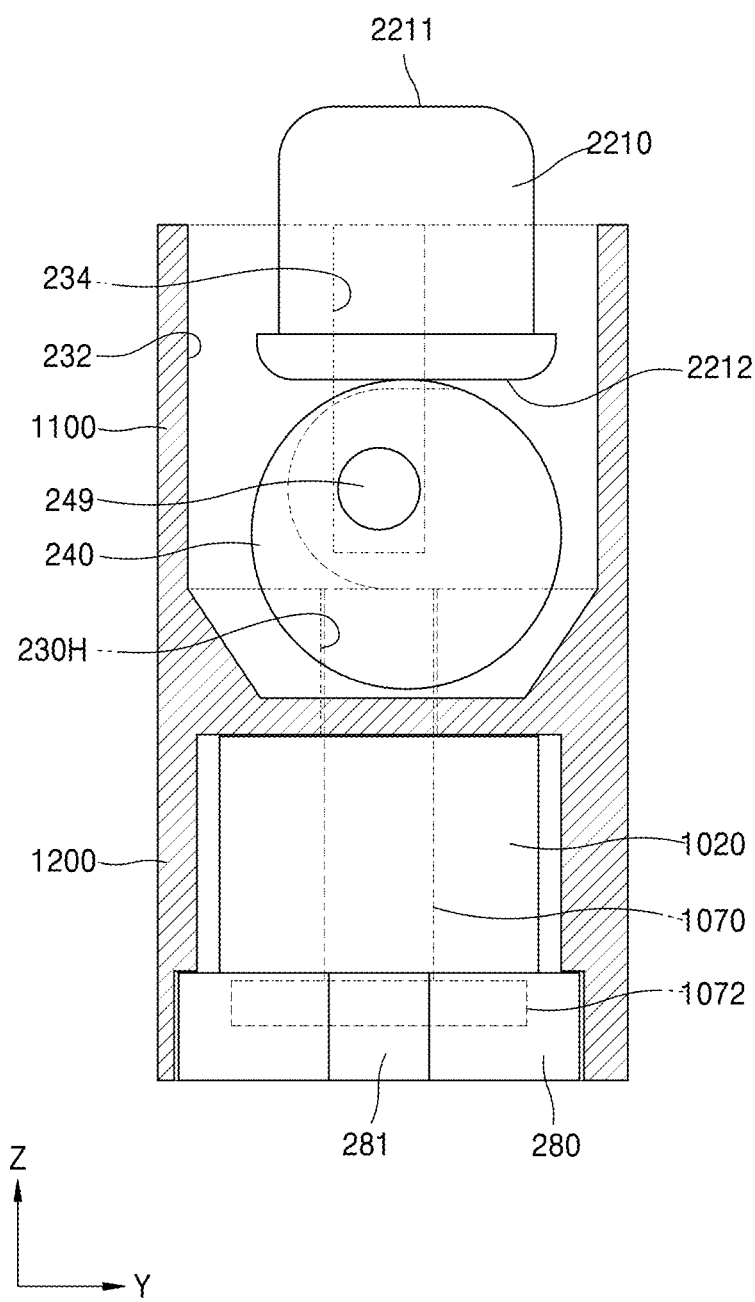
FIG. 41 is a diagram illustrating an assembly of a driving unit and a moving unit, according to another embodiment.

FIG. 41 is a diagram illustrating an assembly of a driving unit and a moving unit, according to another embodiment.

Figure 42:
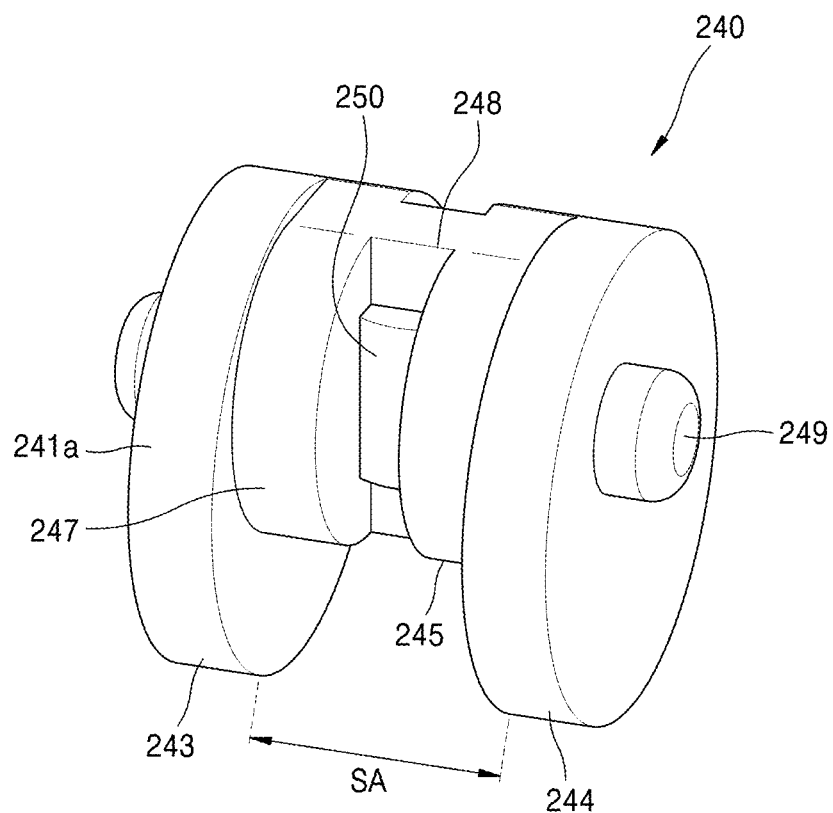
FIG. 42 is a schematic perspective view for describing a moving part of FIG. 41.

FIG. 42 is a schematic perspective view for describing the moving part of FIG. 41.

Figure 43:
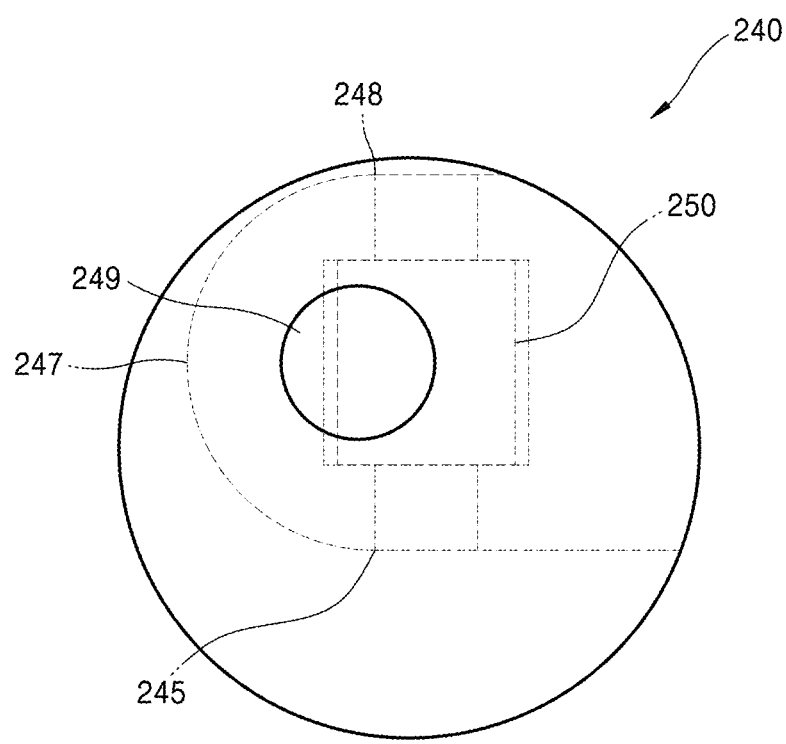
FIG. 43 is a front view of the moving part of FIG. 42 seen from one direction.

FIG. 43 is a front view of the moving part of FIG. 42 seen from one direction.

Figure 44:
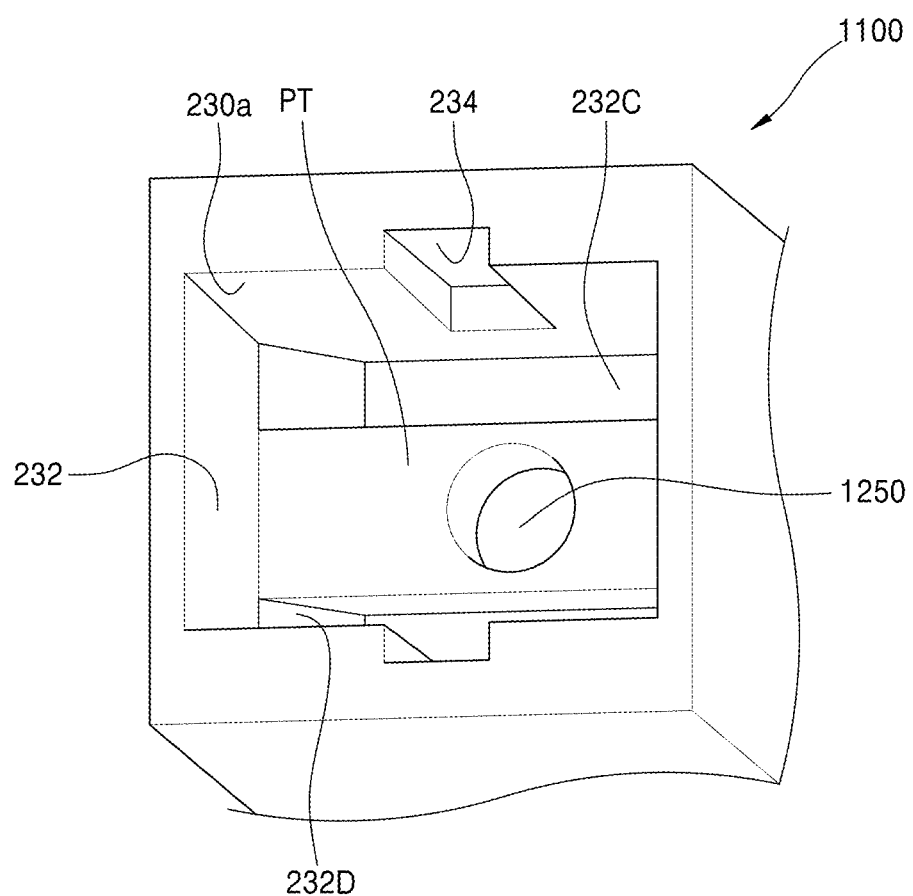
FIG. 44 is a partially perspective view of the assembly of FIG. 41 seen from one direction.

FIG. 44 is a partially perspective view of the assembly of FIG. 41 seen from one direction.

Referring to FIG. 41, an expression unit 2210 may be moved according to a movement of a moving part 240, which will be described below, and may be moved up and down with respect to at least the lengthwise direction of the expression unit 2210. For example, the expression unit 2210 may be moved in the direction toward the coil unit 1020 and the opposite direction.

Accordingly, the expression unit 2210 may be moved to protrude in one direction, and a user may sense the movement of the expression unit 2210 through a tactile or visual sense.

The expression unit 2210 may include an expression surface 2211 and a supporting surface 2212.

The supporting surface 2212 in the expression unit 2210 faces the moving part 240, and forms a lower portion of the expression unit 2210, and may be arranged separately from the moving part 240 and in contact with the moving part 240 at least one point, and the moving part 240 may deliver a force to the expression unit 2210 via the supporting surface 2212.

The expression surface 2211 is an outermost side of the expression unit 2210, for example, a region farthest from the coil unit 1020, and may include a region recognized by a user.

For example, the user may recognize the entire area of the expression unit 2210, but may also recognize only the expression surface 2211. For example, the user may sense the movement of the expression unit 2210 by contacting the expression surface 2211, and may easily sense the movement of the expression unit 2210 by visually sensing the expression surface 2211.

In an alternative embodiment, the expression surface 2211 may include a curved surface.

The expression unit 2210 may have various shapes and may include a pillar-shaped region.

Also, in an alternative embodiment, a protruding region of the expression unit 2210 may have a curved surface, and a corner of the expression unit 2210 may have a curved surface.

The expression unit 2210 may include various materials, for example, an insulating material that is light-weight and has an excellent durability. For example, the expression unit 2210 may include a resin-based organic material. In another example, the expression unit 2210 may include an inorganic material such as a ceramic material.

Also, in another alternative embodiment, the expression unit 2210 may include a material such as metal or glass.

In addition, the expression unit 2210 may be selectively applied to the present specification.

As described above, when a magnetic field is generated by a current flowing through the coil unit 1020, a driving force is transferred to the expression unit 2210 through the magnetic field, and for example, the driving force may be provided to the expression unit 2210 through the movement of the moving part 240.

In an alternative embodiment, an end of the driving support unit 1070 may be elongated to support the moving part 240, and in another alternative embodiment, the moving part 240 may move while being supported by the end of the driving support unit 1070.

In an alternative embodiment, the driving support unit 1070 may be formed to correspond to the penetration portion 1250 of the lower unit 1200.

In an alternative embodiment, the driving support unit 1070 may be connected to a driving support main body 1072, and for example, may be integrally formed with the driving support main body 1072.

In an alternative embodiment, a pedestal unit 280 may be further provided and may surround the driving support main body 1072. In an alternative embodiment, the pedestal unit 280 may include a protrusion 281 on a region thereof, and may be easily handled through a region of the protrusion 281.

An inner accommodation region 232 may be formed in the upper unit 1100, and may include the above-described holder region.

When the upper unit 1100 and the lower unit 1200 are connected or coupled to each other, inner spaces thereof may be connected to each other through the penetration portion 1250.

In an alternative embodiment, a driving groove 234 may be formed in the inner accommodation region 232 of the upper unit 1100. For example, the driving groove 234 may be formed in each of opposite side surfaces facing each other in the inner accommodation region 232, and in an alternative embodiment, may extend in one direction, for example, in a direction away from the coil unit 1020.

In an alternative embodiment, the driving groove 234 may be formed as a groove or a through hole penetrating to the outside. The driving groove 234 may be formed as a groove from which one region therein is removed, without penetrating to the outside.

The moving part 240 may be arranged in the inner accommodation region 232 of the upper unit 1100. The moving part 240 may be spaced apart from the coil unit 1020 in a state in which the moving part 240 is arranged in the inner accommodation region 232.

The moving part 240 is arranged adjacent to the coil unit 1020 and is driven by the electric current flowing through the coil unit 1020 to perform an angular movement or a rotational movement. The expression unit 2210 may be moved in upper and lower directions, for example, in one direction toward the coil unit and the opposite direction, via the movement of the moving part 240.

In an alternative embodiment, the moving part 240 may include a magnetic unit 250, for example, in an internal space thereof. For example, the magnetic unit 250 may include a magnetic material, for example, a permanent magnet.

The magnetic unit 250 may include a first region (e.g., N-pole or S-pole) and a second region (e.g., S-pole or N-pole) having different polarities from each other, and the first region and the second region having the different polarities from each other may be arranged in a direction from the coil unit 1020 toward the expression unit 2210 at a point during the rotation of the moving part 240, for example, in the Z-axis direction.

For example, the first and second regions having different polarities in the magnetic unit 250 may be arranged in a direction from the coil unit 1020 toward the expression unit 2210, for example, in the Z-axis direction.

The moving part 240 includes a driving surface 241a on at least an outer surface thereof, and the driving surface 241a is formed to support the expression unit 2210 and provides a driving force for the expression unit 2210 to be moved up and down.

In an alternative embodiment, the driving surface 241a of the moving part 240 may have a curved outer surface. In more detail, the driving surface 241a of the moving part 240 may include a boundary line that is formed similarly to a circle.

The moving part 240 may include a movement controller 249.

The location at which the moving part 240 is moved may be controlled by the movement controller 249. For example, when the moving part 240 is moved by the coil unit 1020, the moving part 240 may perform an angular or rotational movement about the movement controller 249.

In an alternative embodiment, the central axis of the moving part 240 and the movement controller 249 may not be coincident with each other, but may be eccentric with respect to each other.

In addition, in an alternative embodiment, the magnetic unit 250 does not coincide with the central axis of the moving part 240, and may be arranged, for example, to overlap a region of the movement controller 249.

As such, a torque force with respect to the moving part 240 may be easily generated and the moving part 240 performs an angular or rotational movement such that a movement relative to the expression unit 2210 may be performed effectively and a precise expression of the information output apparatus may be improved. Also, power consumption of the information output apparatus may be reduced.

The moving part 240 will be described in more detail with reference to FIGS. 42 to 44.

Referring to FIGS. 42 and 43, the moving part 240 may include a first moving member 243 and a second moving member 244, and may include a separate area SA between the first and second moving members 243 and 244.

The first moving member 243 and the second moving member 244 may each include the driving surface 241a on at least one of outer surfaces thereof so as to support the expression unit 2210 when the moving part 240 is moved and to provide the expression unit 2210 with a driving force.

In an alternative embodiment, the outer surfaces of the first and second moving members 243 and 244 may include curved surfaces. For example, the first moving member 243 and the second moving member 244 may each have a shape similar to a rotator, and may each have a shape similar to a disc.

As such, when the first moving member 243 and the second moving member 244 perform a rotational or angular movement, a driving force is naturally provided to the supporting surface 2212 of the expression unit 2210 such that the expression unit 2210 may effectively perform a continuous and natural movement.

The movement controller 249 may be arranged on at least one side surface of the first moving member 243 and the second moving member 244, for example, on each of the surfaces opposite to the side surfaces facing each other in the first moving member 243 and the second moving member 244.

In an alternative embodiment, the movement controller 249 may have a protruding shape, which may correspond to the driving groove 234 formed in the inner accommodation region 232 of the upper unit 1100.

For example, the moving part 240 may be moved by the magnetic field generated due to the coil unit 1020, and in detail, the moving part 240 may move up and down due to a repulsive force and an attractive force applied to the magnetic unit 250 in the moving part 240. Here, the moving part 240 may move up and down while rotating about the movement controller 249, and the moving part 240 may rotate in a state in which the movement controller 249 is arranged in the driving groove 234. For example, the movement controller 249 may rotate in the driving groove 234. Also, in an alternative embodiment, the movement controller 249 may slightly move up and down while rotating in the driving groove 234.

A first moving region 245 and a second moving region 248 may be arranged in the separate area SA between the first moving member 243 and the second moving member 244.

The first moving region 245 and the second moving region 248 may be regions that respectively serve as references for a lowest point and a highest point of the movement of the moving part 240.

For example, when the first moving region 245 is at a lowermost portion, that is, a region closest to the coil unit 1020, the moving part 240 is at the lowest point, and accordingly, the expression unit 2210 is at the lowest point, in detail, a protrusion height of the expression unit 2210 from the upper unit 1100 has a minimum value.

Also, when the second moving region 248 is at a lowermost portion, that is, a region closest to the coil unit 1020, the moving part 240 is at the highest point, and accordingly, the expression unit 2210 is at the highest point, in detail, a protrusion height of the expression unit 2210 from the upper unit 1100 has a maximum value.

In an alternative embodiment, the first moving region 245 and the second moving region 248 may be supported by the driving support unit 1070. That is, when the moving part 240 is moved, the driving support unit 1070 is arranged to correspond to the separate area SA between the first moving member 243 and the second moving member 244, so as to support the first moving region 245 and the second moving region 248 according to time.

In an alternative embodiment, a connecting region 247 may be arranged between the first moving region 245 and the second moving region 248, and the connecting region 247 may include a curved surface.

When the moving part 240 rotates, the driving support unit 1070 may support at least a region of the connecting region 247 before supporting the second moving region 248 after supporting the first moving region 245, and as such, the moving part 240 naturally moves and the movement of the expression unit 2210 may be accurately controlled.

A distance between the driving surface 241a and the first moving region 245 may be different from a distance between the driving surface 241a and the second moving region 248. For example, the distance between the driving surface 241a and the first moving region 245 may be greater than the distance between the driving surface 241a and the second moving region 248.

In an alternative embodiment, due to the shape of the moving part 240, a distance from the central axis to the first moving region 245 may be less than a distance from the central axis to the second moving region 248.

In an alternative embodiment, a distance from the movement controller 249 to the first moving region 245 may be equal or similar to a distance from the movement controller 249 to the second moving region 248, and in an additional alternative embodiment, a distance from the movement controller 249 to the connecting region 247 may be also equal or similar to the distance from the movement controller 249 to the second moving region 248.

For example, the connecting region 247 may correspond to at least a region of a circumference having a radius around a center point of the movement controller 249. As such, when the moving part 240 rotates about the movement controller 249, the position of the movement controller 249 may be maintained identically or similarly when the driving support unit 1070 supports the first moving region 245, the second moving region 248, and the connecting region 247.

Also, when being supported by the driving support unit 1070, the connecting region 247 includes a curved surface or a nearly arc surface, and thus, the moving part 240 may move smoothly and sufficiently.

Referring to FIG. 44, the inner accommodation region 232 of the upper unit 1100 may include a first groove 232C and a second groove 232D.

The first groove 232C and the second groove 232D may be deeply recessed toward the coil unit 1020. The first moving member 243 and the second moving member 244 may respectively correspond to the first groove 232C and the second groove 232D. As such, when the driving force is transferred to the moving part 240 via the coil unit 1020, the moving part 240 may perform an angular or rotational movement in a state in which the first moving member 243 and the second moving member 244 of the moving part 240 are arranged to correspond to the first groove 232C and the second groove 232D, respectively, and may move up and down. Accordingly, the moving part 240 may be stably moved, and accurate control of the movement of the expression unit 2210 may be easily performed.

In an alternative embodiment, a protrusion region PT may be formed between the first groove 232C and the second groove 232D. For example, the protrusion region PT may be formed to be connected to the penetration portion 1250. In detail, the driving support unit 1070 may protrude through the penetration portion 1250 to reach the protrusion region PT.

In this case, in an alternative embodiment, the driving support unit 1070 may further protrude as compared with the protrusion region PT, and in this case, the first moving region 245 and the second moving region 248 may be supported by the driving support unit 1070 according to time. In an embodiment, the first moving region 245 may be supported by the upper end of the driving support unit 1070, in detail, in contact therewith. Accordingly, the state in which the expression unit 2210 is at the lowest point may include that the expression unit 2210 is physically latched by the upper end of the driving support unit 1070. In addition, the second moving region 248 may be supported by the upper end of the driving support unit 1070, in detail, in contact therewith. Through this, the state in which the expression unit 2210 is at a point which is different from the lowest point, in an alternative embodiment, at the highest point, may include that the expression unit 2210 is physically latched by the upper end of the driving support unit 1070.

In an alternative embodiment, the driving support unit 1070 may not further protrude as compared with the protrusion region PT, and in this case, the first moving region 245 and the second moving region 248 may be supported by the protrusion region PT according to time.

For example, the first moving region 245 is supported by the top surface of the protrusion region PT, and the state in which the expression unit 2210 is at the lowest point may include that the expression unit 2210 is physically latched by the top surface of the protrusion region PT.

In addition, the second moving region 248 is supported by the top surface of the protrusion region PT, and the state in which the expression unit 2210 is at the highest point may include that the expression unit 2210 is physically latched by the top surface of the protrusion region PT.

Also, in an alternative embodiment, the driving support unit 1070 or the protrusion region PT may not support or may temporarily support the moving part 240, and in this case, the movement controller 249 may be supported by a region of the inner accommodation region 232 of the upper unit 1100, for example, may be supported by a boundary surface of the driving groove 234.

Figure 45:
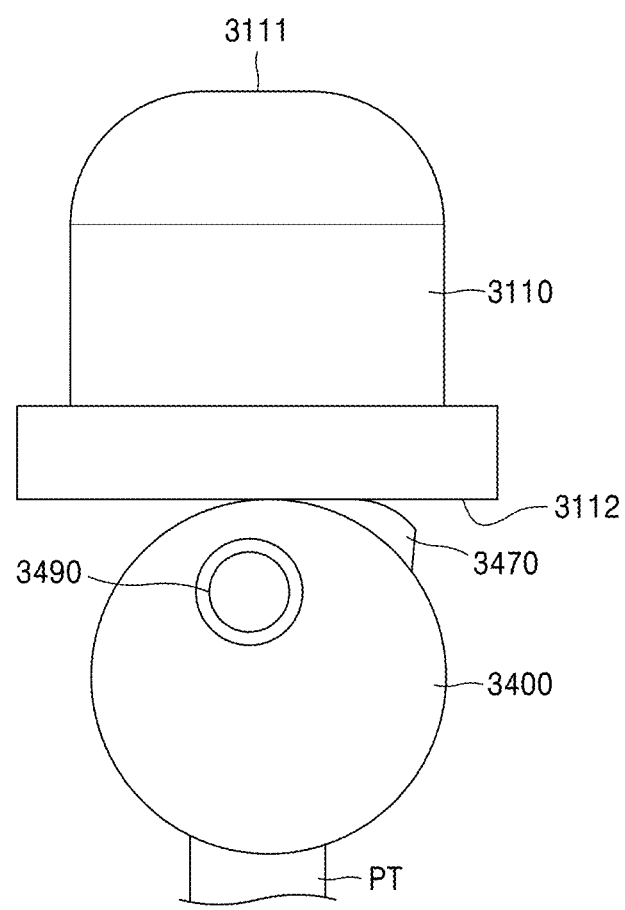
FIGS. 45 and 46 are diagrams for describing a relationship between a moving part and an expression unit, according to another embodiment of the present disclosure.
Figure 46:
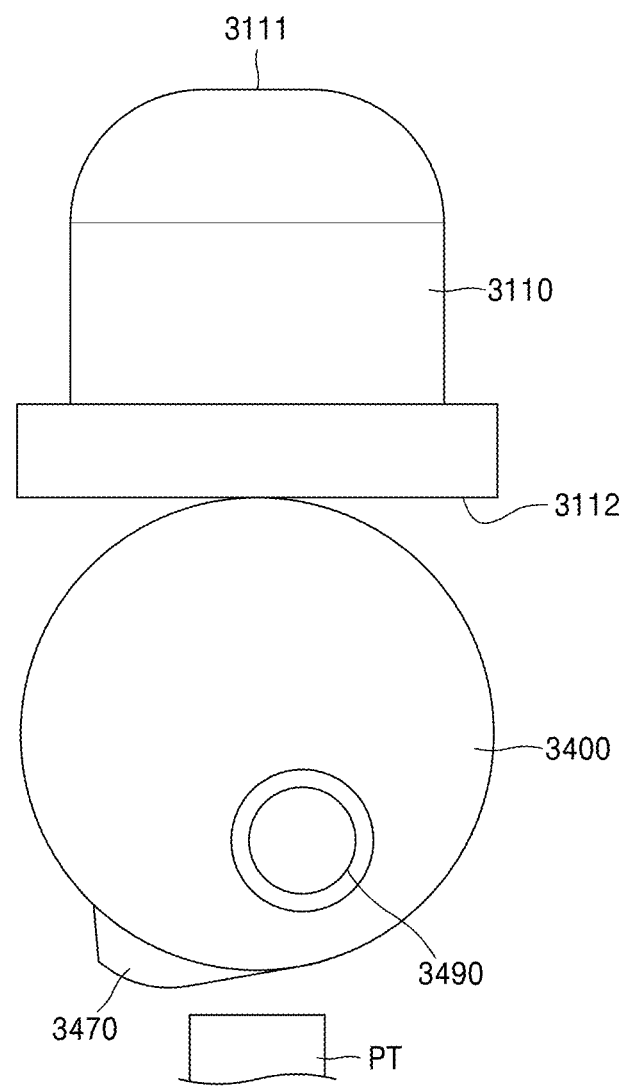

FIGS. 45 and 46 are diagrams for describing a relationship between a moving part and an expression unit, according to another embodiment of the present disclosure.

Referring to FIGS. 45 and 46, a moving part 3400 and an expression unit 3110 are included. Although the members of the above-described embodiments, such as a coil unit, are not illustrated for convenience of description, the members in the above-described embodiments or appropriate modifications thereof may be applied.

The expression unit 3110 may be moved according to movement of the moving part 3400, and may be moved at least upward and downward in the lengthwise direction thereof.

The expression unit 3110 may include an expression surface 3111 and a supporting surface 3112.

In addition, although not illustrated, the expression unit 3110 may include a magnetic body (not shown) therein.

As an alternative embodiment, the expression unit 3110 may have a space portion formed therein, and the space portion may be open toward the moving part 3400.

The moving part 3400 may be moved, for example, as described in the above-described embodiments, may be moved through a magnetic field generated by a current flowing through the coil unit.

In addition, the moving part 3400 may be supported by the protrusion region PT during movement. Although not illustrated, the moving part 3400 may be supported by the driving support unit 1070 described in the above-described embodiment.

As an alternative embodiment, the moving part 3400 may include a driving controller 3490, for example, on at least one side surface thereof, for example, on facing side surfaces thereof.

In an alternative embodiment, the moving part 3400 may perform an angular or rotational movement around the driving controller 3490.

A stopper part 3470 may be formed in one region of the moving part 3400. The stopper part 3470 may have a shape protruding to have a height from a driving surface of the moving part 3400, for example, from an outer surface thereof having a closed curve similar to a circle.

Accordingly, the stopper part 3470 may serve as a barrier against a member adjacent to the stopper part 3470 as illustrated in FIGS. 45 and 46.

For example, as illustrated in FIG. 45, the stopper part 3470 may serve as a barrier against the supporting surface 3112 of the expression unit 3110 and may be resistance to the continuous angular movement in one direction of the moving part 3400, and, as illustrated in FIG. 46, the stopper part 3470 may serve as a barrier against the protrusion region PT and may be resistance to the continuous angular movement in one direction of the moving part 3400.

Also, although not illustrated, during the angular movement of the moving part 3400, the stopper part 3470 may function as various barriers while being supported by adjacent members according to design conditions.

Through the stopper part 3470, it is possible to control an unnecessary continuous angular or rotational movement of the moving part 3400 to reduce the vibration of the expression unit 3110, and to effectively carry out precise control of a movement of the expression unit 3110.

In addition, the moving part 3400 may be effectively controlled to reduce power required to drive the moving part 3400.

Figure 47:
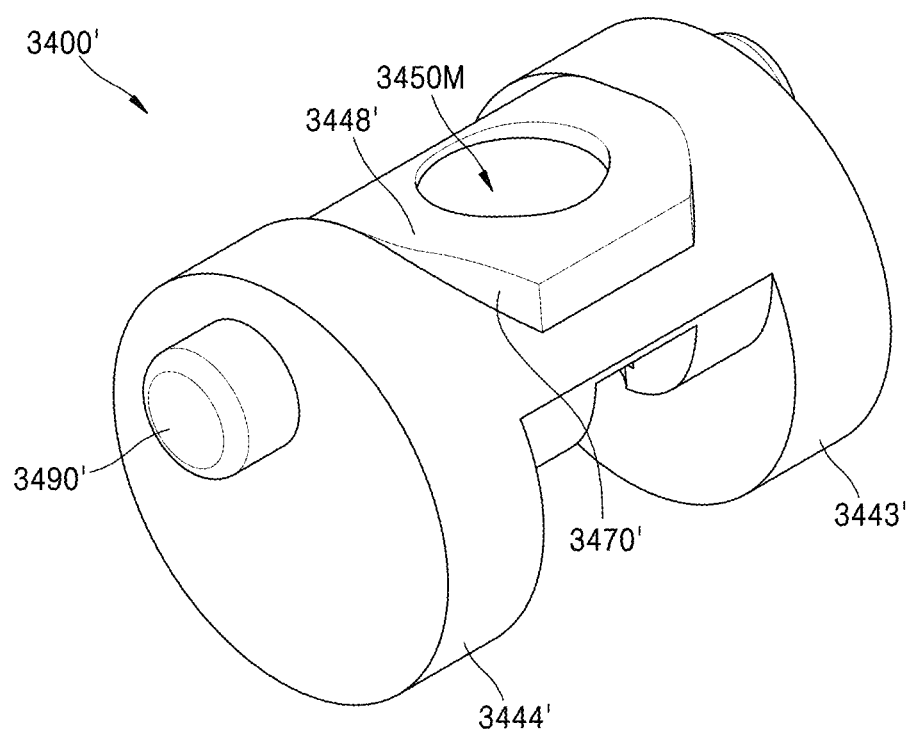
FIGS. 47 and 48 are perspective views of moving parts illustrated in FIGS. 45 and 46, according to alternative embodiments.
Figure 48:
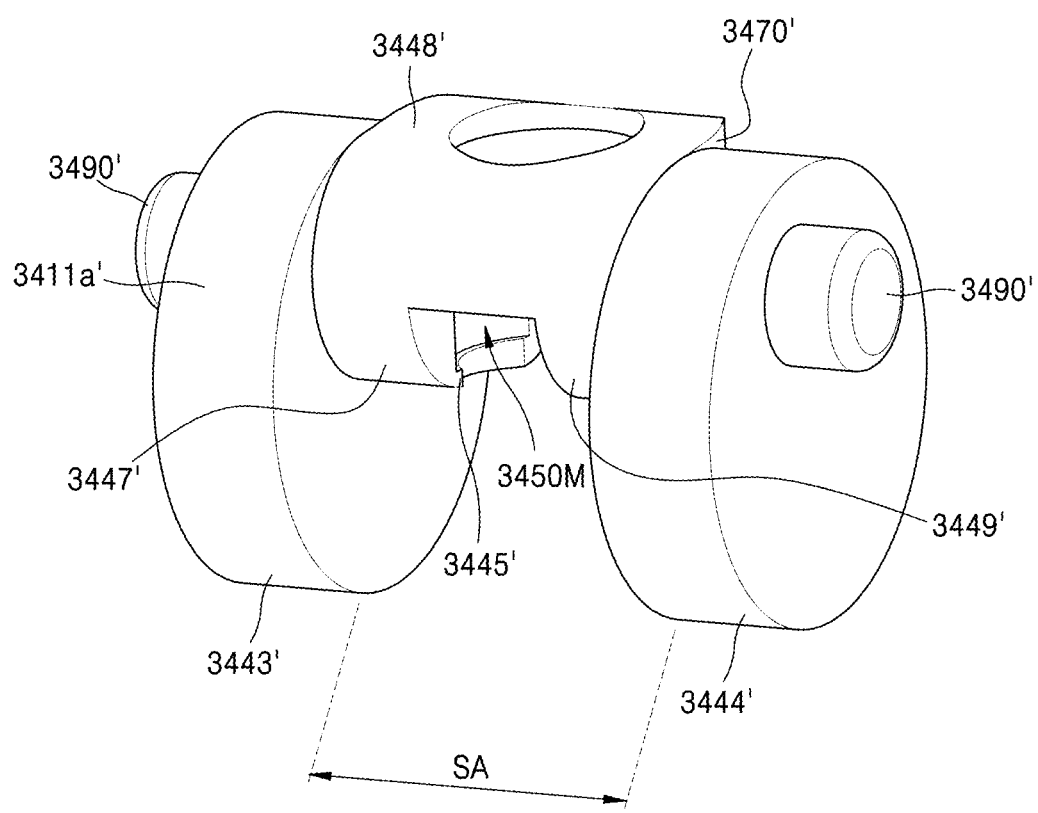

FIGS. 47 and 48 are perspective views of moving parts illustrated in FIGS. 45 and 46, according to alternative embodiments.

Referring to FIGS. 47 and 48, a moving part 3400' may include a first moving member 3443' and a second moving member 3444', which are spaced apart from each other to form a space therebetween.

The first moving member 3443' and the second moving member 3444' may each include a driving surface 3411a' on at least one of outer surfaces thereof so as to support the expression unit 3110 when the moving part 3400' is moved and to provide the expression unit 3110 with a driving force.

In an alternative embodiment, the outer surface of each of the first moving member 3443' and the second moving member 3444' may include a curved surface. For example, the first moving member 3443' and the second moving member 3444' may each have a shape similar to a rotator, and may each have a shape similar to a disc.

A driving controller 3490' may be arranged on at least one side surface of each of the first moving member 3443' and the second moving member 3444', for example, on an opposite side surface of each of facing side surfaces of the first moving member 3443' and the second moving member 3444'.

A first moving region 3445' and a second moving region 3448' may be arranged in the separate area SA between the first moving member 3443' and the second moving member 3444'.

In an alternative embodiment, when the moving part 3400' is moved through the first moving region 3445' and the second moving region 3448', the expression unit 3110 may be raised and lowered.

For example, the first moving region 3445' and the second moving region 3448' may be regions that serve as references for a lowest point and a highest point of the movement of the expression unit 3110.

In an alternative embodiment, the first moving region 3445' and the second moving region 3448' may be supported by the protrusion region PT, and as another example, may be supported by the driving support unit 1070 described in the above-described embodiment.

In an alternative embodiment, a connecting region 3447' may be arranged between the first moving region 3445' and the second moving region 3448', and the connecting region 3447' may have a curved surface.

Although not illustrated, in an alternative embodiment, a magnetic unit (not shown) may be arranged in the moving part 3400', for example, an inner space 3450M' of the moving part 3400'. For example, the magnetic unit (not shown) may include a magnetic material, for example, a permanent magnet. A stopper part 3470' may be formed in one region of the moving part 3400'. For example, the stopper part 3470' may have a shape protruding from the driving surface 3411a' by at least a height. For example, at least one region of the stopper part 3470' may have a protruding shape to have a height with respect to an outer surface of each of the first moving member 3443' and the second moving member 3444'.

In an alternative embodiment, the stopper part 3470' may be formed to be adjacent to the outer surfaces of the first moving member 3443' and the second moving member 3444', and for example, may be connected to the second moving region 3448'.

In an alternative embodiment, the stopper part 3470' may have a height based on the outer surfaces of the first moving member 3443' and the second moving member 3444' and may include regions having different heights.

For example, from among regions of the stopper part 3470', the height of a region thereof farther from the second moving region 3448' may be greater than the height of a region thereof connected to the second moving region 3448'.

Accordingly, the stopper part 3470' may function as effective resistance during the angular movement of the moving part 3400'.

During the angular movement of the moving part 3400' of the embodiment, once a force is applied only until the moving part 3400' reaches the critical point, the angular movement may be additionally performed even without an additional force applied after that point.

Accordingly, only during a portion of the entire time of the operation process of the moving part 3400', a current may be applied to the coil unit and power may be consumed.

In an alternative embodiment, only at the initial stage including the start stage of the operation of the moving part 3400', once a current is applied to the coil unit and thus the moving part 3400' starts to move, due to a torque force through the eccentricity, the moving part 3400' may easily perform an angular movement.

In addition, for example, a region of the moving part 3400' may be supported by the upper end or a protrusion region of the driving support unit, in detail, in contact therewith, and accordingly, the state in which the expression unit is at the lowest point may include that the expression unit is physically latched.

Furthermore, for example, another region of the moving part 3400' may be supported by the driving support unit or a protrusion region, in detail, in contact therewith, and accordingly, the expression unit may be at a point other than the lowest point, in an alternative embodiment, at the highest point, and such a state may include that the expression unit is physically latched by the driving support unit or the protrusion region.

The embodiment may be selectively applied to all embodiments of the present disclosure.

As described above, the present disclosure has been described with reference to the illustrated embodiment in the drawings, but this is merely exemplary, and those skilled in the art will understand that various modifications and other equivalent embodiments are possible therefrom. Therefore, the true technical protection scope of the present disclosure should be determined by the technical spirit of the appended claims.

The specific implementations described in the embodiments are examples, and do not limit the scope of the embodiments in any method. For brevity of the specification, descriptions of conventional electronic configurations, control systems, software, and other functional aspects of the systems may be omitted. In addition, since the connection of the lines between the components or connection members shown in the drawings are illustrative examples of functional connections and/or physical or circuit connections, in the actual device, it may be represented as an alternative or additional various functional connections, physical connections, and circuit connections. In addition, unless "essential", "important", etc. are not specifically mentioned, it may not be a necessary component for the application of the present disclosure.

In the specification (especially in the claims) of the embodiments, the use of the term "the" and similar indicating terms may correspond to both singular and plural. In addition, in the case where a range is described in the embodiment, since it includes the disclosure in which the individual values belonging to the range are applied, unless otherwise stated, it is the same as describing each individual value constituting the range in the detailed description. Finally, when there is no explicit or contradictory description of steps constituting the method according to the embodiment, the steps may be performed in a suitable order. The embodiments are not necessarily limited to the order in which the steps are described. The use of all the examples or exemplary terms (for example, etc.) in the embodiments is merely for describing the embodiments in detail. Accordingly, the scope of the embodiments may not be limited by the examples or exemplary terms, unless limited by the claims. In addition, those skilled in the art may recognize that various modifications, combinations, and changes may be configured according to design conditions and factors within the scope of the appended claims or equivalents thereof.

What is claimed is:

1. An information output apparatus comprising:
   an upper unit comprising at least one expression unit, the expression unit being configured to move in at least one direction and to be sensed by a user;
   a lower unit arranged to overlap the upper unit and comprising at least one driving force providing unit configured to provide a driving force for the expression unit,
   the driving force providing unit comprising a driving support unit and a coil unit arranged around the driving support unit,
   in response to an electric field being applied to the coil unit, and a current flowing through the coil unit, the driving force configured to cause the expression unit to move upward or downward, and
   the lower unit comprising a first surface facing the upper unit and a second surface opposite to the first surface; and
   a base unit arranged to overlap the lower unit and facing the second surface of the lower unit.

2. The information output apparatus of claim 1, wherein the at least one expression unit of the upper unit comprises a plurality of expression units.

3. The information output apparatus of claim 2, wherein the at least one driving force providing unit of the lower unit comprises a plurality of driving force providing units corresponding to the plurality of expression units of the upper unit.

4. The information output apparatus of claim 1, wherein the upper unit is configured to be coupled to or separated from the lower unit.

5. The information output apparatus of claim 4, wherein the upper unit and the lower unit are configured to be coupled to or separated from each other by a pressure or a tensile force applied from an external source.

6. The information output apparatus of claim 1, wherein the lower unit is configured to be coupled to or separated from the base unit.

7. The information output apparatus of claim 1, wherein the upper unit comprises a moving unit or a moving part to be moved by a driving force provided by the driving force providing unit, to transfer the driving force to the expression unit.

8. The information output apparatus of claim 7, wherein the moving unit or the moving part is configured to perform an angular movement or a rotational movement in at least one direction.

9. The information output apparatus of claim 1, wherein the information output apparatus comprises a plurality of information output apparatuses arranged to be adjacent to each other in a direction adjacent to at least one of a plurality of side surfaces of the upper unit, the lower unit, and the base unit.

10. The information output apparatus of claim 1,
    wherein the upper unit comprises one or more grooves facing the lower unit,
    wherein the lower unit includes one or more extension units that project upwardly toward the upper unit, and
    wherein the upper unit and the lower unit are configured to be engaged and disengaged by engagement and disengagement of the one or more extension units of the lower unit with the one or more grooves of the upper unit.

* * * * *